(12) United States Patent
Russo

(10) Patent No.: US 10,981,487 B1
(45) Date of Patent: *Apr. 20, 2021

(54) HITCH MOUNTED LIFT GATE SYSTEM WITH PIVOTING DOOR-ACCESS DROP FEATURE AND METHOD OF LOADING AND UNLOADING A PAYLOAD

(71) Applicant: Gator Liftgates, LLC, Mount Pleasant, TX (US)

(72) Inventor: Justin Russo, Mount Pleasant, TX (US)

(73) Assignee: Gator Liftgates, LLC, Mount Pleasant, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,364

(22) Filed: Aug. 22, 2019

Related U.S. Application Data

(60) Provisional application No. 62/722,323, filed on Aug. 24, 2018.

(51) Int. Cl.
*B60P 1/44* (2006.01)

(52) U.S. Cl.
CPC ........... *B60P 1/4485* (2013.01); *B60P 1/4421* (2013.01); *B60P 1/4471* (2013.01)

(58) Field of Classification Search
CPC ...... B60P 1/4485; B60P 1/4421; B60P 1/4471
USPC ................................................. 414/462–466
See application file for complete search history.

(56) References Cited

U.S. PATENT DOCUMENTS

| | | |
|---|---|---|
| 3,185,322 A | 5/1965 | Matthews |
| 3,257,011 A | 6/1966 | Randall et al. |
| 3,282,449 A | 11/1966 | Buford |
| 3,638,811 A | 2/1972 | Robinson |
| 3,641,835 A | 2/1972 | Tornheim |
| 3,791,541 A | 2/1974 | Himes |
| 3,800,915 A | 4/1974 | Himes |
| 4,252,492 A | 2/1981 | Scothern |
| RE31,157 E | 2/1983 | Perkins |
| 4,408,948 A | 10/1983 | Robinson |
| 4,474,527 A | 10/1984 | Risner et al. |
| 4,563,121 A | 1/1986 | Drews |
| 4,729,712 A | 3/1988 | Corley, Jr. |
| 4,808,056 A | 2/1989 | Oshima |
| 4,930,969 A | 6/1990 | Langer |
| 4,984,955 A | 1/1991 | McCullough |
| 5,122,026 A | 6/1992 | Kent |
| 5,232,329 A * | 8/1993 | Livingston ............... B60P 1/54 414/462 |
| 5,263,808 A | 11/1993 | Kent |
| 5,277,275 A | 1/1994 | Ablabutyan |
| 5,513,943 A | 5/1996 | Lugash et al. |
| 5,941,677 A | 8/1999 | De Boer |
| 6,183,187 B1 | 2/2001 | Ablabutyan |
| 6,234,740 B1 | 5/2001 | Page |
| 6,364,419 B1 | 4/2002 | Cannizzo et al. |

(Continued)

*Primary Examiner* — Lynn E Schwenning
(74) *Attorney, Agent, or Firm* — Sherrill Law Offices, PLLC

(57) ABSTRACT

A hitch mounted lift gate system and method of loading and loading a payload from a cargo vehicle using the lift gate system. The frame and platform of the lift gate system is pivotable relative to the hitch and hitch receiver as between a vertical use position and a horizontal dropped position for facilitating opening and closing of rear doors on the vehicle to which the lift gate system is mounted when the rear doors pivot about a vertical axis.

19 Claims, 18 Drawing Sheets

(56) References Cited

U.S. PATENT DOCUMENTS

| | | |
|---|---|---|
| 6,398,479 B1 | 6/2002 | Dupuy et al. |
| 6,435,804 B1 | 8/2002 | Hutchins |
| 6,685,421 B1 | 2/2004 | Reeves |
| 6,705,825 B2 | 3/2004 | Kreutinger |
| 6,746,200 B1 | 6/2004 | Rinke |
| 6,837,670 B2 | 1/2005 | Goodrich |
| 6,893,203 B2 | 5/2005 | Anderson et al. |
| 7,217,078 B2 * | 5/2007 | Short ................. B65F 1/1452 224/282 |
| 7,275,902 B1 | 10/2007 | Klotz |
| 7,484,921 B2 * | 2/2009 | Murphy ............... B60P 1/4421 414/462 |
| 7,491,026 B2 | 2/2009 | Hooker |
| 7,573,221 B2 | 8/2009 | Rock |
| 7,806,647 B2 | 10/2010 | Gomes et al. |
| 7,931,433 B2 | 4/2011 | Ablabutyan et al. |
| 8,043,040 B2 | 10/2011 | Nespor |
| 8,602,437 B1 | 12/2013 | Morris |
| 8,740,539 B2 | 6/2014 | Ablabutyan |
| 9,193,233 B2 | 11/2015 | Schwarz et al. |
| 9,341,212 B2 | 5/2016 | Hambardzumyan |
| 9,616,796 B2 | 4/2017 | Russo et al. |
| 9,616,976 B2 * | 4/2017 | Tingey .................. B63B 7/085 |
| 2006/0051191 A1 | 3/2006 | Dupuy et al. |
| 2006/0145461 A1 | 7/2006 | Anderson |
| 2008/0048161 A1 | 2/2008 | Meyer |
| 2008/0111348 A1 | 5/2008 | Lawson |
| 2009/0072570 A1 | 3/2009 | Savoy |
| 2009/0309331 A1 | 12/2009 | Ryan |
| 2010/0124479 A1 | 5/2010 | Brooks |
| 2010/0225137 A1 | 9/2010 | Gunby |
| 2011/0305550 A1 | 12/2011 | Haire |
| 2014/0154035 A1 | 6/2014 | Walker |

\* cited by examiner

HITCH MOUNTED LIFT GATE SYSTEM WITH PIVOTING DOOR-ACCESS DROP FEATURE AND METHOD OF LOADING AND UNLOADING A PAYLOAD

FIELD OF THE INVENTION

The present invention relates generally to a receiver-mounted lift gate, and more specifically to a removable receiver-mounted lift gate and wheeled skate body assembly. Even more specifically, the present invention relates to a single electric drive, receiver-mounted lift gate with drop function for accommodating the opening and closing of rear access doors on a panel van with the lift gate mounted to the receiver, and removable wheeled skate body assembly for positioning the receiver-mounted lift gate relative to a vehicle.

BACKGROUND OF THE INVENTION

Pickup trucks, panel vans and other vehicles used for transporting goods, equipment, and other cargo such as for the building, and/or agriculture industries feature cargo beds that are generally parallel to the ground, and ride a number of inches above the ground. These cargo beds have proven to be incredibly versatile, and beneficial, and have led, in part, to the popularity of vehicles such as pickup trucks and panel vans for both commercial and personal uses.

Various means have been developed for facilitating the loading and unloading of cargo from these vehicles. For example, ramps positioned against a tailgate can be used in combination with a hand truck to facilitate loading and unloading. In the same vein, such vehicles can be backed against a loading dock for this same purpose. In addition, various technologies for lifting cargo, such as fork lifts, cranes, and the like can be employed in the loading and unloading of such vehicles.

Unfortunately, these above-mentioned technologies all require devices or fixtures at the site of loading or unloading to assist in this process. These devices may not be available everywhere, such that during the sequence of loading, transporting, and unloading, the operator may find him/herself without the aid of these technologies either during the loading or unloading of the cargo, or both.

While cranes have been installed in such vehicles, they tend to be specialized and limited to a small percentage of the overall variety of cargo types that may be transported by such vehicles, e.g., a crane may be suitable for lifting cargo that is structured or packaged with appropriate lift points, and/or positioned within the vehicle to lift and lower the cargo from and to specific positions, their application is generally limited. In addition, such cranes can create clearance problems when cargo other than that for which they are designed is to be loaded or unloaded, and must be removed in such cases, sometimes requiring additional technologies to lift the crane off of the vehicle.

As such, lift gates have become somewhat popular as a solution to the challenge of loading and unloading cargo from vehicles. A lift gate is positioned generally where a tailgate would be on a factory stock pickup truck or cargo truck, e.g., box truck, and generally replaces the tailgate, hence the "gate" portion of the name lift gate. In addition, the lift gate can be repositioned from a vertical orientation, where it functions as a "gate" into a horizontal orientation where it functions as a "lift." While in its horizontal orientation, the lift gate can be lowered to the ground (or even raised to a higher level to align with a loading dock) in order to facilitate the easy loading of cargo onto the lift gate. Once loaded with cargo, the lift gate can be repositioned, such as by using an assembly of linkages and hydraulic cylinders, to a position generally coplanar with the cargo bed in order to facilitate the easy loading of cargo from the lift gate into the cargo bed, or vice versa. This lowering or raising and repositioning of the lift gate may need to be repeated multiple times for multiple batches of cargo in order to fully load the cargo bed.

Unfortunately, the installation of a lift gate does have its drawbacks. Most notably, because a lift gate often replaces the tailgate of the vehicle, and because it must be secured to the vehicle frame in order to both be portable and provide sufficient lifting capacity, installation of a lift gate generally requires permanent removal of the tailgate, and bumper of the vehicle, and fixation of the lift gate machinery to the frame of the vehicle, such as by welding or drilling of mounting holes. Such installation often required specialized mounting brackets suitable of installing the lift gate into the particular make/model/year of vehicle into which the lift gate is to be installed. In addition, the hydraulic cylinders of the lift gate must be supplied with a source of electrical power at 12V and, for example, approximately 100 A.

Accordingly, a need exists for a lift gate capable of being quickly and easily attached and detached to a cargo transport vehicle, and suitable for use with both vehicles having a drop tail gate that pivots about a vertical axis such as found on pickup trucks and vehicles having rear doors that pivot about a vertical axis such as found on panel vans.

SUMMARY OF THE INVENTION

In a first aspect, the invention is a lift gate system which includes a pair of laterally spaced and longitudinally extending parallel uprights, a laterally extending cross member, a transversely extending hitch sleeve for detachable coupling to a receiver tube, a pair of carriers, a platform and a drive mechanism. The uprights each include a track. The cross member is coupled to the uprights. The hitch sleeve is pivotally coupled to the cross member for permitting pivoting of the cross member between 45° and 100° about a lateral axis relative to the hitch sleeve. Such pivoting of the cross member effects concomitant pivoting of the uprights as between a vertical use position and a horizontal dropped position. A carrier is coupled to each of the uprights for travel along a respective track. The platform is attached to and travels with the carriers. The drive mechanism is coupled to the carriers for movement of both carriers at the same velocity for uniform raising and lowering of the platform when the drive mechanism is activated.

In a second aspect, the invention is a method of loading a payload into a cargo hold of a vehicle having at least one rear door which pivots about a vertical axis, using a lift gate system in accordance with the first aspect of the invention attached to a receiver tube on the vehicle. The method includes the sequential steps of (i) pivoting the cross member from the vertical use position to the horizontal dropped position, (ii) opening the at least one rear door on the vehicle, (iii) pivoting the cross member from the horizontal dropped position into the vertical use position, (iv) lowering the first and second legs of the lift gate into supporting contact with ground, (v) before or after step (iv), pivoting the platform to horizontal, lowering the platform, and placing a payload onto the lowered horizontal platform, (vi) raising the loaded platform to vertically align with a floor of the cargo hold, (vii) moving the payload from the raised platform to the cargo hold, (viii) pivoting the platform to vertical, (ix) pivoting the cross member from the vertical use position to the horizontal dropped position, (x) closing the at least one rear door on the vehicle; and (xi) pivoting the cross member from the horizontal dropped position into the vertical use position.

BRIEF DESCRIPTION OF THE DRAWINGS

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

The above and other aspects, features and advantages of several embodiments of the present invention will be more apparent from the following more particular description thereof, presented in conjunction with the following drawings.

FIG. 15 is a side plan view of the receiver-mounted lift gate in accordance with the embodiment of FIG. 1 including a ground-mounted receiver used with the receiver-mounted lift gate. Embodiments of the present invention will now be described, by way of example only, with reference to the following drawings, in which:

DETAILED DESCRIPTION OF THE INVENTION

Definitions

As utilized herein, including the claims, the term approximately 90° when used in reference to pivoting of the cross member means pivoting of between 70° and 95°.

NOMENCLATURE

04 Carrier
08 Drive Mechanism
12 Leg Outer Shell
14 Leg Inner Shell
16 Leg Post
18 Cargo Bed
20 Hitch Receiver
22 Platform Flap
24 Platform Center
26 Kick Flap
28 Hinges
28a Rear Hinge
28b Front Hinge
32 Lower Linkage
34 Upper Linkage
36 Upright
38 Tension Member
40 Rear Friction Reducer
42 Front Friction Reducer
44 Cross Member
46 Hitch
50 Upper Sheave
52 Lower Sheave
54 Upper Sheave Support
56 Lower Sheave Support
58 Mounting Bracket
60 Hitch Gusset
62 Spool Clamp
64 Spool Spacer
68 Skate Body
70 Caster Wheel
72 Accessory
76 Leg Drive Mechanism
78 Mechanical Fastener
80 Hitch Pin
82 Skate Fastener
84 Tensioner 86 Spool
88 Non-Vehicular Hitch Receiver
90 Hitch Sleeve
92 Hitch Drive Mechanism
94 Accessory Fastener
100 Base Wraps
120 Pivot System
122 Shaft
122r Right Side Shaft
122s Left Side Shaft
124 Inside Mounting Plates
124r Right Inside Mounting Plate
124s Left Inside Mounting Plate
126 Outside Mounting Plates
126r Right Outside Mounting Plate
126s Left Outside Mounting Plate
128 Bolts
140 Spring Lift Assist System
142 Torsion Spring
142r Right Side Torsion Spring
142s Left Side Torsion Spring
142t Center Block of Forked Torsion Spring
160 Locking System
161 Prongs
161r Right Side Prong
161s Left Side Prong
162 Stop Tab
163 Adjustable Stop
164 Pin
165 Sleeve
166 Biasing Spring
167 Lever
168 Cable
169 Bore
169r Bore Through Right Side Prong
169s Bore Through Left Side Prong
169t Bore Through Hitch
170 Plate
D Door
V Vehicle
Construction The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Before beginning, it should be noted that the directional coordinate system used is defined from a forward facing driver's perspective; i.e. forward refers to the front of the vehicle, rear refers to the direction of the rear of the vehicle, left is defined as the driver's left, right is defined as a driver's right, up refers to the direction of the drivers head from the seat, and down refers to ground level from a driver's seat.

Figure 1:
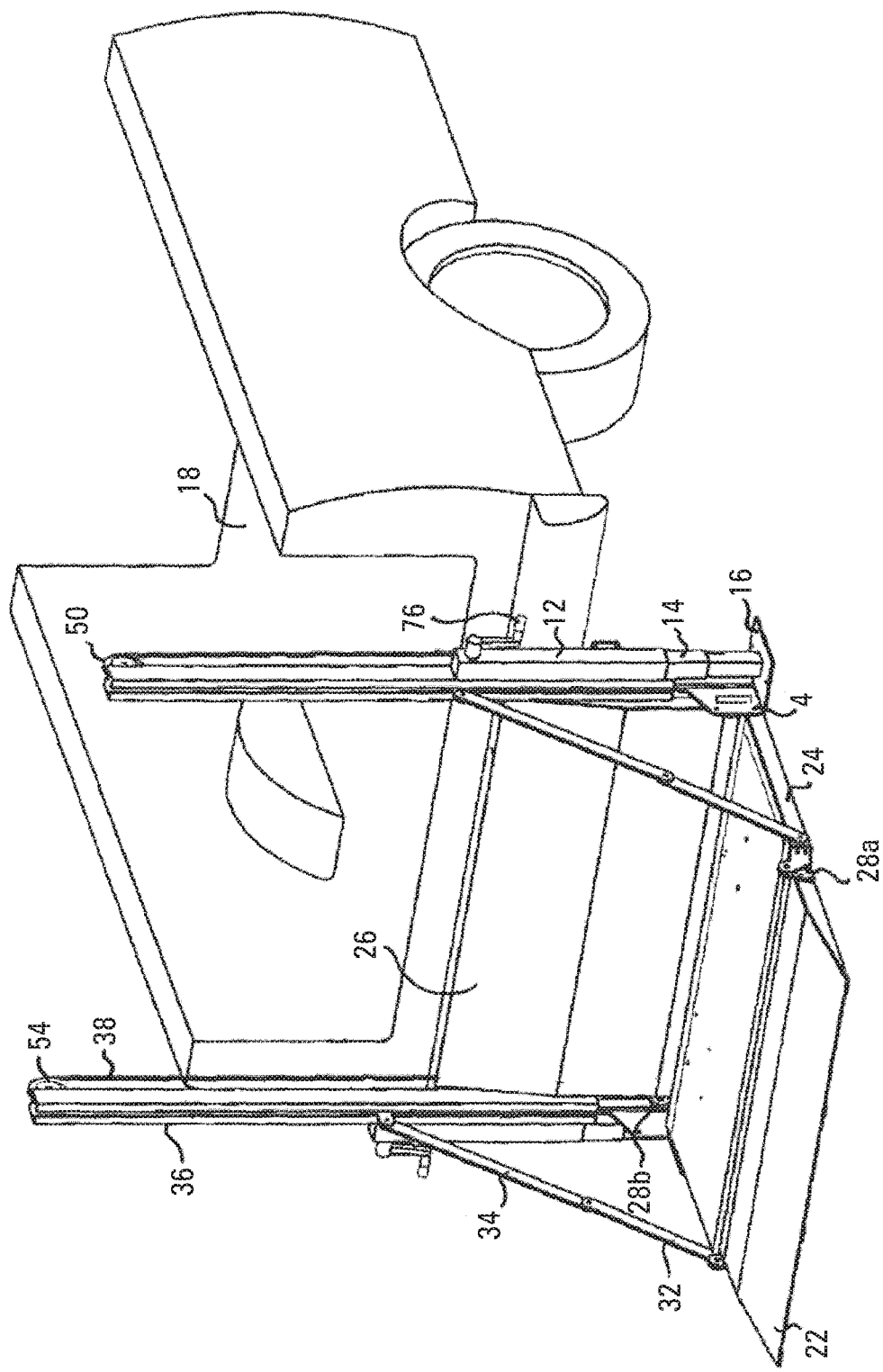
FIG. 1 is a perspective view of a receiver-mounted lift gate in accordance with one embodiment of the present invention.

Referring first to FIG. 1, a perspective view is shown of a receiver-mounted lift gate in accordance with one embodiment of the present invention. The present embodiment is the removable lift gate system that includes a platform flap 22, a platform center 24, a kick flap 26, two rear hinges 28a, two front hinges 28b, two carriers 4, two lower linkages 32, two upper linkages 34, two uprights 36, two flexible tension members 38, two upper sheave supports 54, two upper sheaves 50 (or pulleys), two leg outer shells 12, two leg inner shells 14, two leg posts 16, and a leg drive mechanism 76. FIG. 1 also includes a vehicle with a cargo bed 18.

The platform assembly comprises the bodies and connections including: a platform flap 22, a platform center 24, a kick flap 26, two rear hinges 28a, and two front hinges 28b.

As shown in FIG. 1, the platform flap 22 pivotally joins to the platform center 24 via the rear hinges 28a located at the joint of the platform flap 22 and platform center 24. The forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab. The kick flap 26 pivotally joins to the platform center 24 via the front hinges 28b located at the joint of the kick flap 26 and platform center 24.

Each carrier 4 is housed, either wholly or partially depending on the configuration, within its respective upright 36 so that the long axes of each body are generally vertically aligned. Each leg outer shell 12 mounts to the outside face of an upright 36 so that the long axes of each body lie generally vertically parallel. The leg outer shell 12 has a leg inner shell 14 within it in a manner such that the outside face(s) of the leg inner shell 14 concentrically align with the inside faces of the leg inner shell 14. Each leg post 16 sits within a leg inner shell 14 in an exact orientation as the leg inner shell 14 within the leg outer shell 12. A leg drive mechanism 76 mounts to the leg outer shell 12 and its driving unit attaches to the leg inner shell 14.

The tops of both carriers 4 pivotally connect to the end of the flexible tension member 38 of its respective side. The flexible tension member 38 begins at the carrier 4 top connection, runs generally along the central long axis of the upright 36 up to the upright's 36 top and about 180 degrees around the upper sheave's 50 groove towards the front and continues down the front face of the upright 36 in a generally vertical route. Each upper sheave 50 is pivotally connected to an upper sheave support 54. The upper sheaves 50 are located near the top of each upright 36 with the flat faces of each upper sheave 50 parallel to the sides of the uprights 36 and the groove in-line with the flexible tension member's 38 route.

The platform flap 22 pivots about the rear hinges 28a, from a position that extends to the posterior of the platform center 24 with the top surfaces of the two bodies generally parallel, approximately 180 degrees in the upwards direction so that the platform flap's 22 top surface lays over the platform center's 24 top surface. The kick flap 26 pivots about the front hinges 28b in an exact manner as the platform flap 22 pivots about the rear hinges 28a. The pivoting of the platform flap 22 and kick flap 26 about hinges 28a and 28b, respectively, may occur through man or mechanical power. The kick flap 26 pivoting motion is automatically controlled by a guide that pilots the kick flap 26 as the platform center 24 is lifted from ground level to the height of the vehicle's cargo bed 18, as in the positions shown in FIG. 2 and FIG. 4. At ground level, the kick flap 26 sits in the vertical position and as it lifts the guide continuously tilts the kick flap 26 towards the front until it is horizontal at the height of the cargo bed 18. The front hinges 28b and rear hinges 28a exhibit pivot points located above the top surface of the platform center 24 that enables the kick flap 26 and platform flap 22 to pivot at least 180 degrees. The platform flap 22 is optional and the platform center 24 may be used without it.

Figure 2:
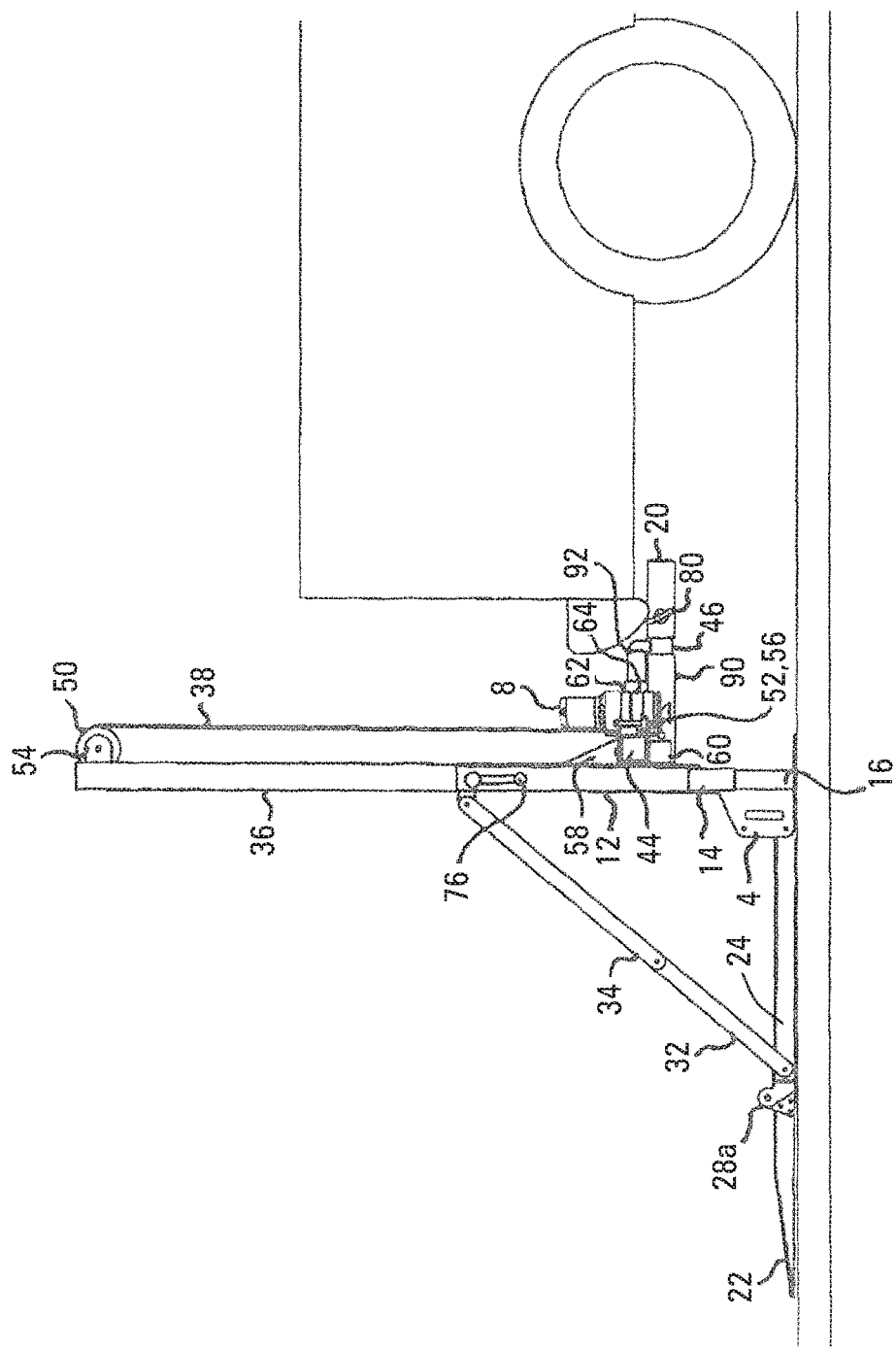
FIG. 2 is a side plan view of the receiver-mounted lift gate in a lowered position in accordance with the embodiment of FIG. 1.
Figure 5:
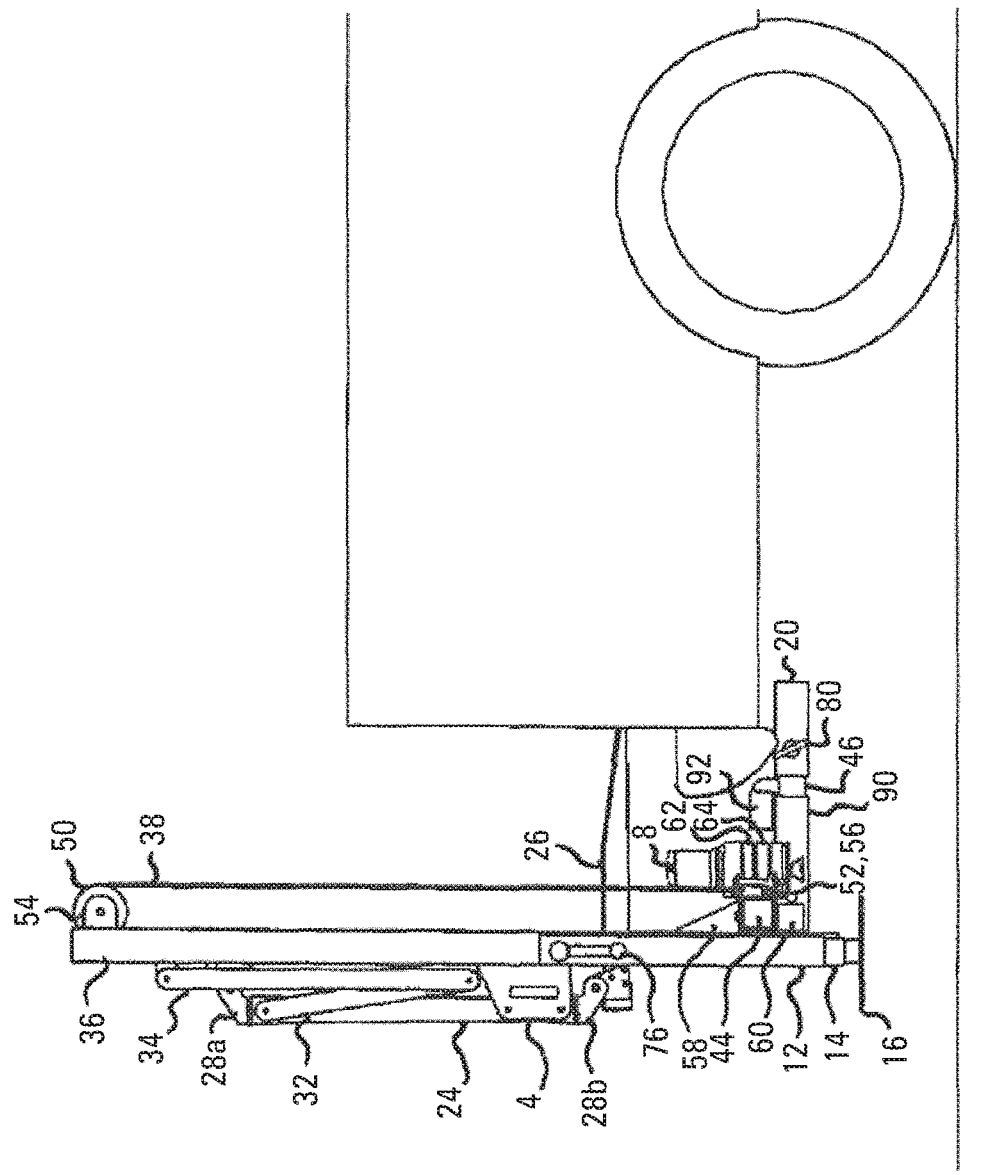
FIG. 5 is a side plan view of the receiver-mounted lift gate in a raised position with a kick flap lowered in accordance with the embodiment of FIG. 1.

The platform center 24 pivots about the carrier's 4 lower tab from a position parallel to the ground, shown in FIG. 2 to a position vertical to the ground, shown in FIG. 5. When the platform center 24 sits parallel to the ground, the lower linkages 32 and upper linkages 34 lockout in tension in an extended configuration with their long axes collinear as shown in FIG. 2. Upon folding of the platform center 24 to the vertical position, the upper linkages 34 and lower linkages 32 rotate about their pivoting connections and collapse so that the upper linkage's 34 long axis lies vertical and parallel to the long axis of the upright while the lower linkage's 32 long axis sits at a slight rearward angle to the upper linkage's vertical long axis shown in FIG. 5. The upper linkage 34 and lower linkage 32 may be replaced by any flexible or collapsible members that hold tension when loaded but allows the platform center 24 to be folded to a vertical position such as, but not limited to, chain link, wire rope, or cable.

The carrier 4 vertically translates with respect to the upright 36 it is housed within. Depending on the height of the platform center 24, the carrier 4 may be fully enclosed within the upright 36 or partially enclosed at its upper portions with the lower portion dropping through the bottom of the tubular cross-member 44. Each upright 36 is tubular shaped with an open slot down the entire back face's length, see FIG. 7, so that tabular protrusions from the carrier 4 extend beyond the upright's 36 inside enclosure and allow the platform center 24 and upper linkages 34 to pivotally connect to the tabs without interfering with the upright 36 or carrier 4 upon pivotal motion.

When the flexible tension members 38 are pulled in by the drive mechanism 8, each carrier 4 is translated in the vertical direction inside of its respective upright.

The leg outer shell 12 is fixedly attached to the upright 36. The leg post 16 freely slides vertically within the leg inner shell 14 and is manually secured to the inner shell 14 through, but not limited to, a clamp, pin, or wedge when a desired position is reached. The inner shell 14 vertically translates within the outer shell 12 via a leg drive mechanism 76 that is automatically powered. The leg drive mechanism 76 can also be manually powered through a hand crank. During lifting or lowering of the platform the leg posts 16 contact the ground to act as supports. The leg inner shell 14 supports the hitch 46 by pressing the leg posts 16 against the ground, providing a reactive force to support the hitch 46.

Referring next to FIG. 2, a side plan view is shown of the receiver-mounted lift gate in a lowered position in accordance with the embodiment of FIG. 1. Shown are a platform flap 22, a platform center 24, a rear hinge 28a, a carrier 4, a lower linkage 32, an upper linkage 34, an upright 36, a flexible tension member 38, an upper sheave support 54, an upper sheave 50, a leg outer shell 12, a leg inner shell 14, a leg post 16, a leg drive mechanism 76, a cross-member 44, a mounting bracket 58, a drive mechanism 8, two spool clamps 62, a spool spacer 64, a lower sheave 52 (or pulley), a lower sheave support 56, a hitch 46, a hitch pin 80, a hitch gusset 60, a hitch sleeve 90, a hitch drive mechanism 92, and a hitch receiver 20 of a vehicle.

As shown in FIG. 2, the platform flap 22 pivotally joins to the platform center 24 via the rear hinges 28a located at the joint of the platform flap 22 and platform center 24. The forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab.

The hitch 46 is a long tubular member that partially rests concentrically within a hitch receiver 20 and projects out towards the rear of the vehicle generally in line with the long axis of the vehicle and parallel to the ground plane. The rear portion of the hitch 46 slidably sits within a concentric, outer tubular member called the hitch sleeve 90. A hitch drive 92 lays in line with the hitch 46 and hitch sleeve 90. A fixed portion of the hitch drive 92 mounts to the hitch sleeve 90 with its driving end attached to the hitch 46.

The cross-member 44 is a long tubular member that sits horizontal to the ground and parallel to the long axis of the vehicle's bumper. The top face of the hitch sleeve 90, towards its rear, mounts to the bottom face of the cross-member 44 generally towards the center of the cross-member's 44 long axis. A hitch gusset 60 mounts from the underside of the cross-member 44 to the underside of the hitch 46. The lower front face of each upright 36 mounts to the rear face of the cross-member 44, one towards each end of the cross-member 44, through a mounting bracket 58. The mounting bracket 58 aligns the upright generally vertical to the ground and perpendicular to the cross-member 44.

Each lower sheave 52 is pivotally mounted with a lower sheave support 56 onto the cross-member's 44 front face so that the planar face of the lower sheave 52 is parallel to the cross-member 44 front face. Each lower sheave 52 is located towards the cross-member's 44 ends in a manner that its groove generally vertically aligns with the upper sheave 50 of its respective side. The flexible tension member 38 is routed around the lower sheave 52 approximately 90 degrees towards the center of the cross-member 44 and along the cross-members 44 front face in a generally horizontal fashion until it connects to the drive mechanism 8.

One flexible tension member's 38 end mounts to the upper portion of the spool 86 towards the rear in the radial direction while the other flexible tension member's 38 end mounts to the lower portion of the spool 86, 180 degrees on the opposite side of the spool 86 in the radial direction. Starting at the axial ends of the spool 86, each flexible tension member 38 wraps around the spool 86 at least once and works its way inwards towards the axial center of the spool 86 one flexible tension member's 38 width per wrap.

The spool spacer 64 mounts around the spool 86 in the space between the two flexible tension 38 member wraps generally in the center of the spool's 86 long axis. Each spool clamp 62 mounts around a flexible tension member's 38 base wraps and leaves a space between itself and the spool spacer 64 of equal or greater width to the width of the flexible tension member 38. The flexible tension member 38 sits between the broad faces of the spool clamp 62 and spool spacer 64 and exits the spool 86 in the radial direction.

The front portion of the hitch 46 concentrically sits within the hitch receiver 20 and is locked into place by a hitch pin 80 that passes through the two bodies. The outer faces of the hitch 46 are firmly pressed against the inner walls of the hitch receiver 20 by a hitch lock (not shown). The hitch lock may embody, but is not limited to, a clamping mechanism that presses the outside hitch 46 face(s) firmly against the inside wall(s) of the hitch receiver 20 or a two piece hitch cut at an angle so that when the front piece draws axially towards the rear piece it climbs the rear angled surface and presses against the inner hitch receiver 20 walls and the rear hitch piece's angled surface. The hitch 46 may also rest in the hitch receiver 20 without the support of a hitch lock.

As shown in FIG. 2, the rear portion of the hitch 46 sits concentrically within a hitch sleeve 90 just as the front portion of the hitch 46 can sit in the hitch receiver 20. The hitch sleeve 90 is able to slide axially along the hitch 46 so as to move the cross-member 44, and thus the platform assembly, nearer or farther from the hitch receiver 20. This motion is controlled either directly from the drive mechanism 8 or a hitch drive 92, which can be manually or automatically powered through, but not limited to, a rotational or linear actuator. The hitch 46 may be locked into place relative to the hitch sleeve 90 by a hitch lock (not shown) similar to that described between the hitch 46 and the hitch receiver 20, by the hitch drive 92 itself, or not at all.

The rear of the hitch 46 may also mount directly to the cross-member, therefore excluding the hitch sleeve 90 and hitch drive 92 from the invention and preventing any relative motion between the cross-member 44 and the hitch 46.

The hitch sleeve 90 serves as a receiver that allows hitches to be attached. For example, a ball hitch may be slid into the hitch sleeve 90 and fixed in place to allow towing of a trailer while the invention is attached to a vehicle. Alternatively, another hitch receiver-sized tubular member (not shown) may be attached to the cross-member 44 and/or hitch 46 either coaxially with the hitch or in any position within the vertical plane passing through the hitch's 46 long axis while also maintaining a parallel relationship between the long axes of the hitch 46.

Figure 3:
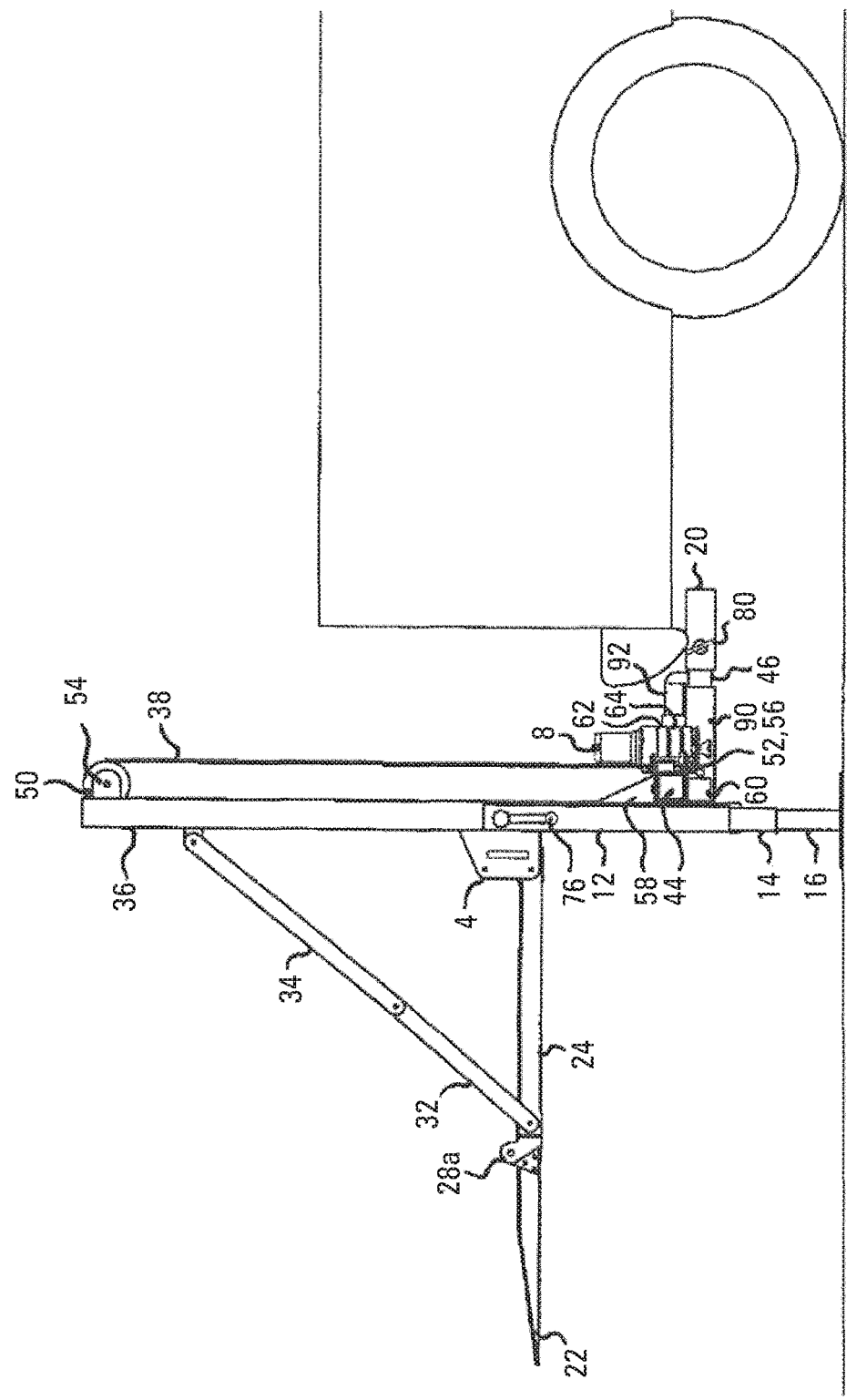
FIG. 3 is a side plan view of the receiver-mounted lift gate in a raised position in accordance with the embodiment of FIG. 1.

Referring next to FIG. 3, a side plan view is shown of the receiver-mounted lift gate in a raised position in accordance with the embodiment of FIG. 1.

Shown are a platform flap 22, a platform center 24, rear hinges 28a, a carrier 4, a lower linkage 32, an upper linkage 34, an upright 36, a flexible tension member 38, an upper sheave support 54, an upper sheave 50, a leg outer shell 12, a leg inner shell 14, a leg post 16, a leg drive mechanism 76, a cross-member 44, a mounting bracket 58, a drive mechanism 8, two spool clamps 62, a spool spacer 64, a lower sheave 52, a lower sheave support 56, a hitch pin 80, a hitch 46, a hitch gusset 60, a hitch sleeve 90, a hitch drive mechanism 92, and a hitch receiver 20 of a vehicle.

As shown in FIG. 3, the platform flap 22 pivotally joins to the platform center 24 via the rear hinges 28a located at the joint of the platform flap 22 and platform center 24. The forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab.

Figure 4:
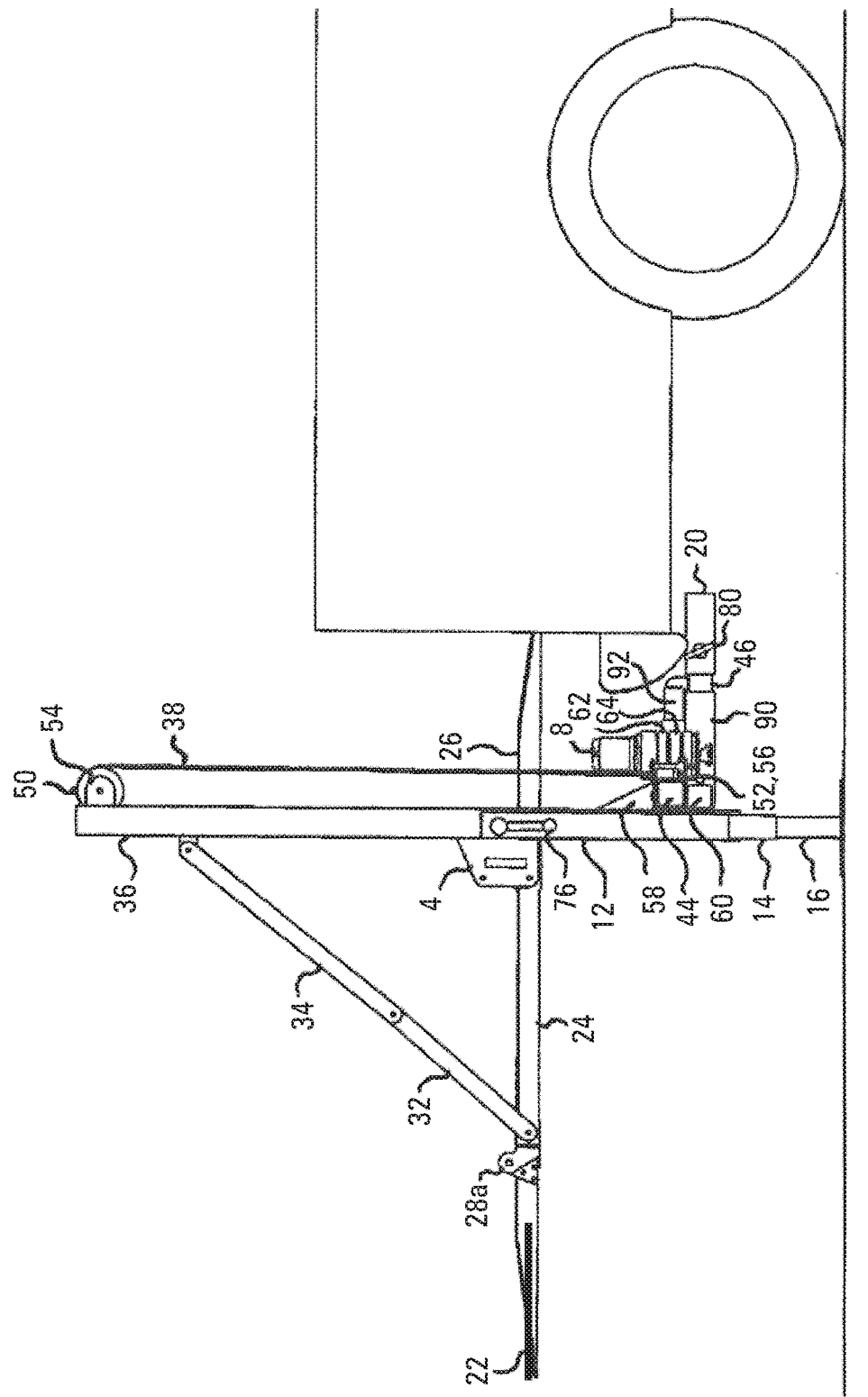
FIG. 4 is a side plan view of the receiver-mounted lift gate in a raised position with a kick flap lowered in accordance with the embodiment of FIG. 1.

Referring next to FIG. 4, a side plan view is shown of the receiver-mounted lift gate in a raised position with a kick flap 26 lowered in accordance with the embodiment of FIG. 1.

Shown are a platform flap 22, a platform center 24, a kick flap 26, rear hinges 28a, a carrier 4, a lower linkage 32, an upper linkage 34, an upright 36, a flexible tension member 38, an upper sheave support 54, an upper sheave 50, a leg outer shell 12, a leg inner shell 14, a leg post 16, a leg drive mechanism 76, a cross-member 44, a mounting bracket 58, a drive mechanism 8, two spool clamps 62, a spool spacer 64, a lower sheave 52, a lower sheave support 56, a hitch pin 80, a hitch 46, a hitch gusset 60, a hitch sleeve 90, a hitch drive mechanism 92, and a hitch receiver 20 of a vehicle.

As shown in FIG. 4, the platform flap 22 pivotally joins to the platform center 24 via the rear hinges 28a located at the joint of the platform flap 22 and platform center 24. The forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab. The kick flap 26 pivotally joins to the platform center 24 via the front hinges 28b located at the joint of the kick flap 26 and platform center 24.

Referring next to FIG. 5, a side plan view is shown of the receiver-mounted lift gate in a raised position with a kick flap 26 lowered in accordance with the embodiment of FIG. 1.

Shown are a platform center 24, a kick flap 26, rear hinges 28a, front hinges 28b, a carrier 4, a lower linkage 32, an upper linkage 34, an upright 36, a flexible tension member 38, an upper sheave support 54, an upper sheave 50, a leg outer shell 12, a leg inner shell 14, a leg post 16, a leg drive mechanism 76, a cross-member 44, a mounting bracket 58, a drive mechanism 8, two spool clamps 62, a spool spacer 64, a lower sheave 52, a lower sheave support 56, a hitch pin 80, a hitch 46, a hitch gusset 60, a hitch sleeve 90, a hitch drive mechanism 92, and a hitch receiver 20 of a vehicle.

With the hitch 46 mounted to a hitch receiver 20, each leg post 16 and inner leg shell 14 vertically lifts off the ground so that the weight of the invention rests solely on the hitch 46.

Figure 6:
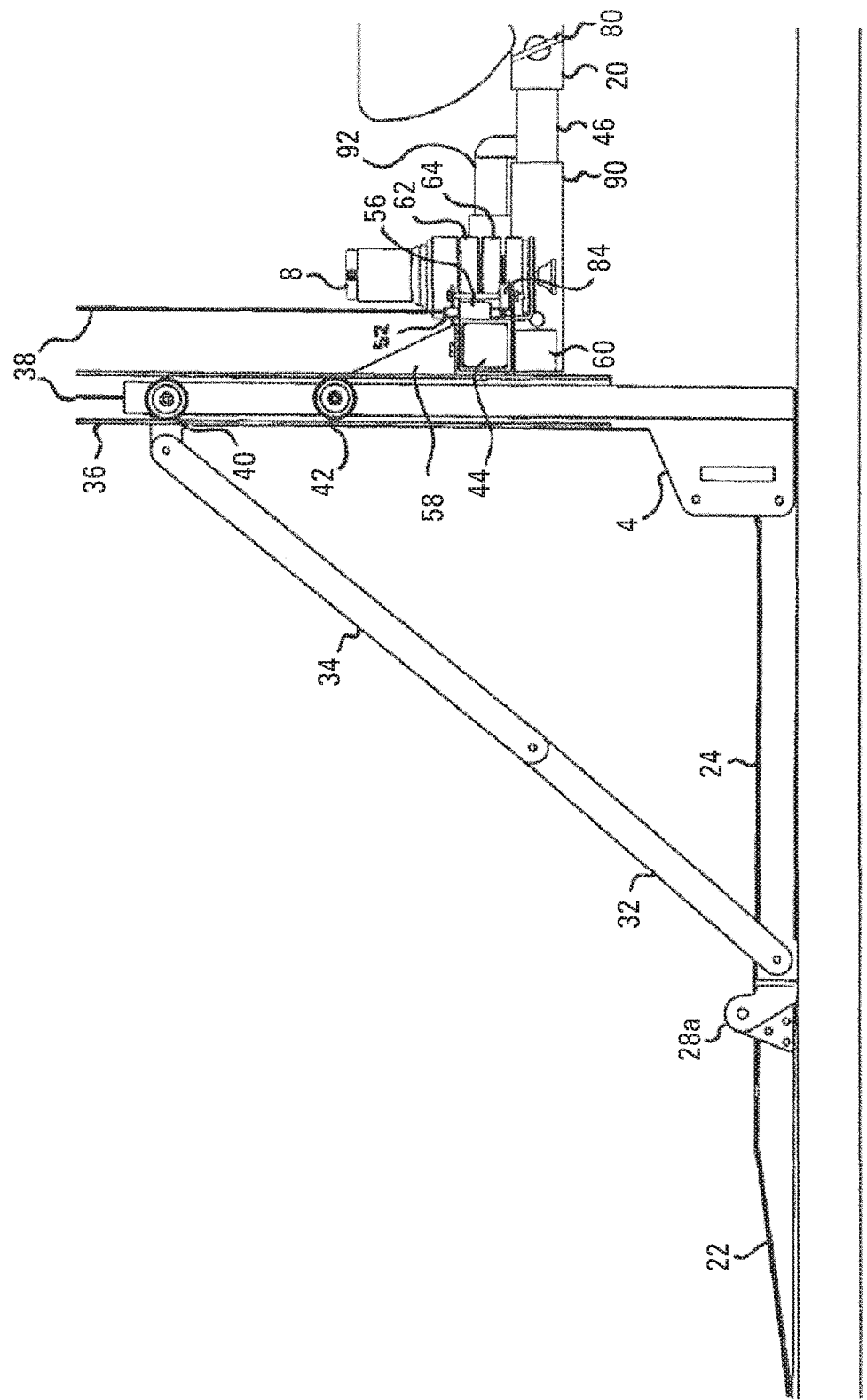
FIG. 6 is a side partial cross-sectional view of the receiver-mounted lift gate in a lowered position in accordance with the embodiment of FIG. 1.

Referring next to FIG. 6, a side partial cross-sectional view is shown of the receiver-mounted lift gate in a lowered position in accordance with the embodiment of FIG. 1.

FIG. 6 contains a platform center 24, a rear hinge 28a, a carrier 4, a lower linkage 32, an upper linkage 34, an upright 36, a flexible tension member 38, a cross-member 44, a mounting bracket 58, a front friction reducer 42, a rear friction reducer 40, a drive mechanism 8, a tensioner 84, two spool clamps 62, a spool spacer 64, a lower sheave 52, a lower sheave support 56, a hitch pin 80, a hitch 46, a hitch gusset 60, a hitch sleeve 90, a hitch drive mechanism 92, and a hitch receiver 20 of a pickup truck. Note that the leg outer shell 12, leg inner shell 14, leg post 16, and leg drive mechanism 76 have been removed from FIG. 6 to reveal the carrier 4 within the sectioned view of the upright 36.

As shown in FIGS. 5 and 6, the kick flap 26 pivotally joins to the platform center 24 via the front hinges 28b located at the joint of the kick flap 26 and platform center 24. The forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab. The kick flap 26 pivotally joins to the platform center 24 via the front hinges 28b located at the joint of the kick flap 26 and platform center 24.

Each carrier 4 is housed, either wholly or partially depending on the configuration, within its respective upright 36 so that the long axes of each body are generally vertically aligned. Mounted towards the rear face of the carrier 4 is a rear friction reducer 40 and towards the front face of the carrier 4 a front friction reducer 42 is mounted. The rear friction reducer 40 contacts the inside portion of the upright's 36 rear face while the front friction reducer 42 contacts the inside portion of the upright's 36 front face so that so that the long axes of the upright 36 and carrier 4 are generally vertically aligned.

When the flexible tension members 38 are pulled in by the drive mechanism 8, each carrier 4 is lifted along the respective upright 36 from the ground to the height of the vehicle's cargo bed 18.

Figure 7:
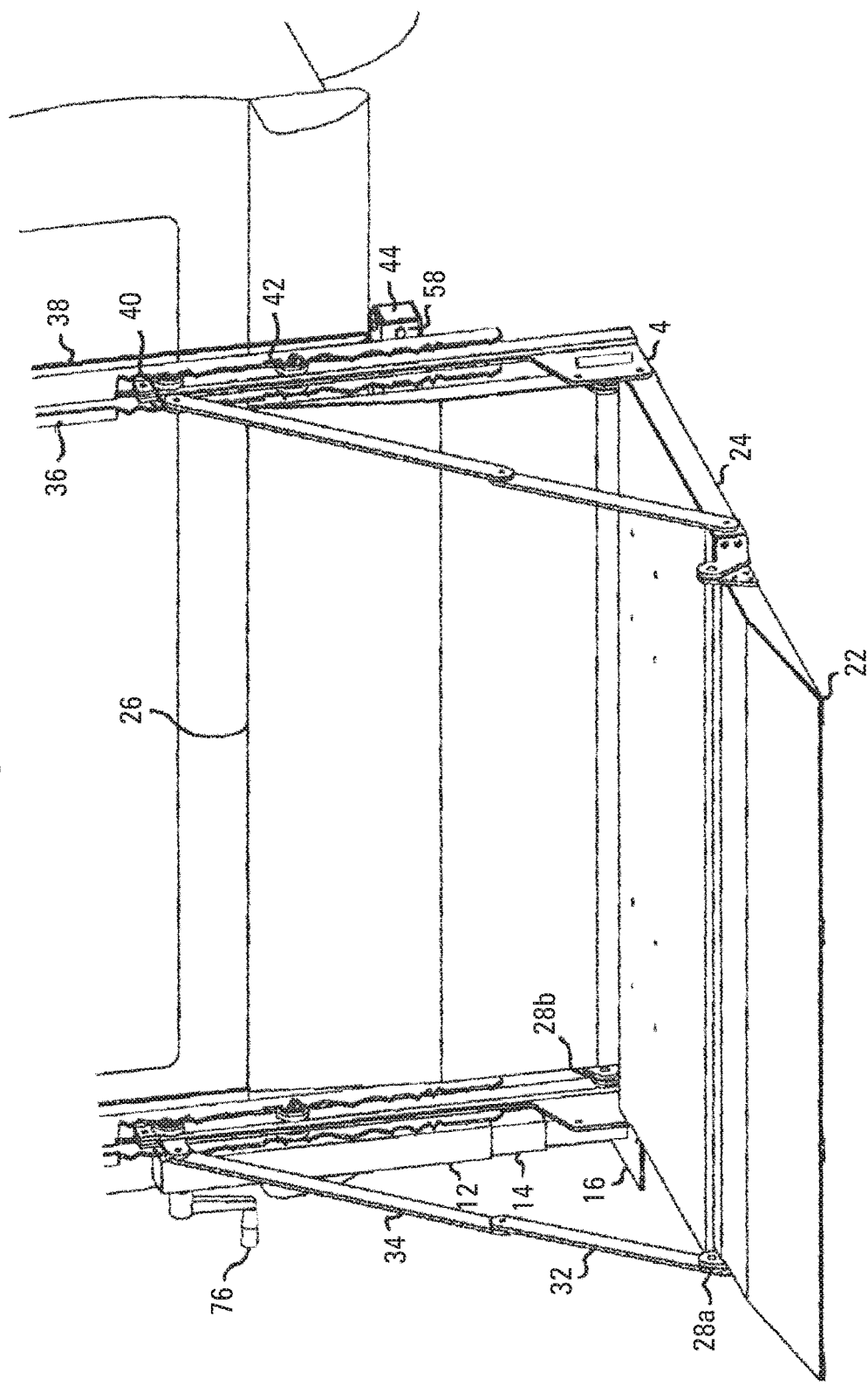
FIG. 7 is a perspective cut-away view of the receiver-mounted lift gate in a lowered position in accordance with the embodiment of FIG. 1.

Referring next to FIG. 7, a perspective cut-away view is shown of the receiver-mounted lift gate in a lowered position in accordance with the embodiment of FIG. 1.

As shown in FIG. 7 and FIG. 1, a slot runs along the entire length of the upright's 36 rear face that allows the pivoting connections of the platform center 24 and upper link 34 to the carrier 4 to vertically translate the upright 36 without interference. This slot may also run along the inside face of each upright 36 so long as it allows the pivoting connections mentioned before to translate the upright 36 without interference. The upright 36 may or may not have a finite slot on its front face, starting from the upright's 36 top and down some finite length, which allows the upper sheave 50 to be inset within the upright 36 for general alignment of the vertically tangential edge of the upper sheave 50 with the axial center of the carrier 4.

The rear and front friction reducers, 40 and 42 respectively, may be rollers, as shown in FIG. 7, low friction slide pads, or any other attachment that stabilizes and eases the vertical motion of the carrier 4 within the upright 36. A low-friction slide pad would perform the same function as a roller by mounting towards the rear and front faces of the carrier 4 and contacting the inner walls of the upright 36. The number of front and rear friction reducers, 42 and 40 respectively, is not fixed; any number of them may be included on each carrier 4 and mounted on any face of the carrier, whether that be the front, rear, left, right, top, or bottom face(s).

Shown are a platform flap 22, a platform center 24, a kick flap 26, two rear hinges 28*a*, two front hinges 28*b*, two carriers 4, two lower linkages 32, two upper linkages 34, two uprights 36, two flexible tension members 38, a leg outer shell 12, a leg inner shell 14, a leg post 16, a cross-member 44, a mounting bracket 58, a front friction reducer 42, a rear friction reducer 40, and a drive mechanism 8.

Each leg outer shell 12 mounts to the outside face of an upright 36 so that the long axes of each body lie generally vertically parallel. Both leg outer shells 12 have a leg inner shell 14 within it in a manner such that the outside face(s) of the leg inner shell 14 concentrically align with one another. Each leg post 16 sits within a leg inner shell 14 in an exact orientation as the leg inner shell 14 within the leg outer shell 12.

A leg drive mechanism 76 mounts to the leg outer shell 12 and its driving unit attaches to the leg inner shell 14.

Figure 8:
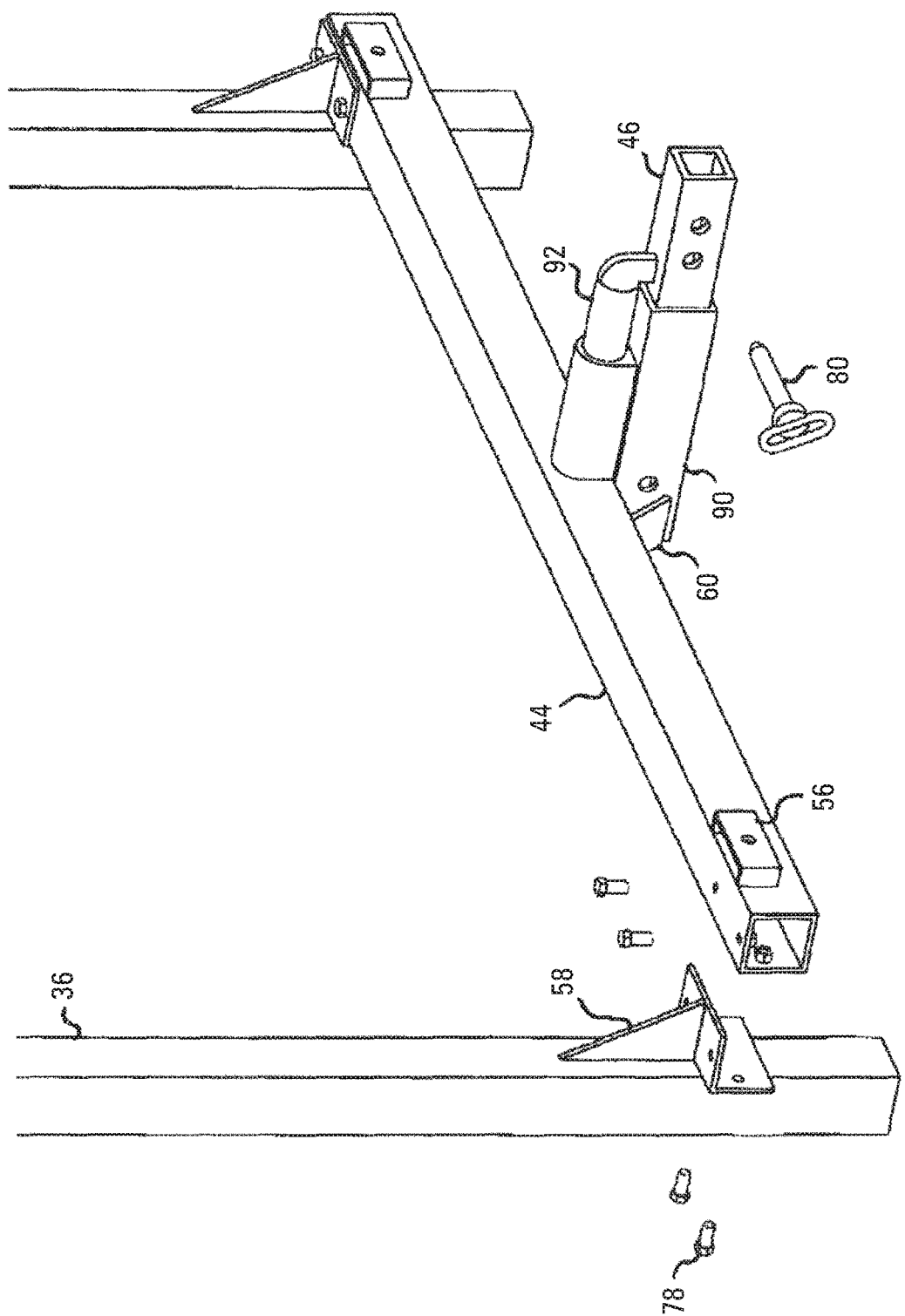
FIG. 8 is a partial, exploded assembly view of the receiver-mounted lift gate in accordance with the embodiment of FIG. 1.

Referring next to FIG. 8, a partial, exploded assembly view is shown of the receiver-mounted lift gate in accordance with the embodiment of FIG. 1.

Shown are two uprights 36, mechanical fasteners 78, two mounting brackets 58, a cross-member 44, two lower sheave supports 56, a hitch 46, a hitch gusset 60, a hitch sleeve 90, a hitch drive mechanism 92, and a hitch pin 80.

The cross-member 44 is a long tubular member that sits horizontal to the ground and parallel to the long axis of the vehicle's bumper. The top face of the hitch sleeve 90, towards its rear, mounts to the bottom face of the cross-member 44 generally towards the center of the cross-member's 44 long axis. A hitch gusset 60 mounts from the underside of the cross-member 44 to the underside of the hitch 46. The lower front face of each upright 36 mounts to the rear face of the cross-member 44, one towards each end of the cross-member 44, through a mounting bracket 58. The mounting bracket 58 aligns the upright generally vertical to the ground and perpendicular to the cross-member 44 and secures them in place with mechanical fasteners 78 that attach the two bodies together through the mounting bracket 58.

The mounting brackets 58 allow the uprights 36 to removably attach to the cross-members 44 through the use of mechanical fasteners 78. The mechanical fasteners 78 used to mount the uprights 36 to the cross-members 44 may be of various types including but not limited to threaded fasteners, clamping fasteners, or cam-locking fasteners.

The mounting brackets 58 may be bypassed and the upright 36 is permanently attached to the cross-member 44 through a permanent adhering process, such as welding. In such a case, a member, like a gusset, forming a generally vertically planed rib between the front face of the upright 36 and the top face of the upright 36, replaces the support element of the mounting bracket 58.

The lower face of the upright 36 may be mounted so that it is flush with the bottom face of the cross-member 44 offset downwards towards the ground so the upright's 36 bottom protrudes vertically past the cross-member 44, as shown in FIG. 8.

The upper sheave support 54 and lower sheave supports 56 mount the upper sheave 50 and lower sheave 52, respectively, in the positions explained above, but the orientation and the manner in which the upper sheave 50 and lower sheave 52 are mounted are not held strictly to these positions. The lower sheave 52 may be oriented so that its planar face sits at any angle relative to the cross-member's 44 front face and it may even be mounted to the front face of the upright 36. The upper sheave's 50 planar faces may sit at any angle relative to the upright 36 and be mounted at any position vertically along the upright's 36 front face.

Figure 9:
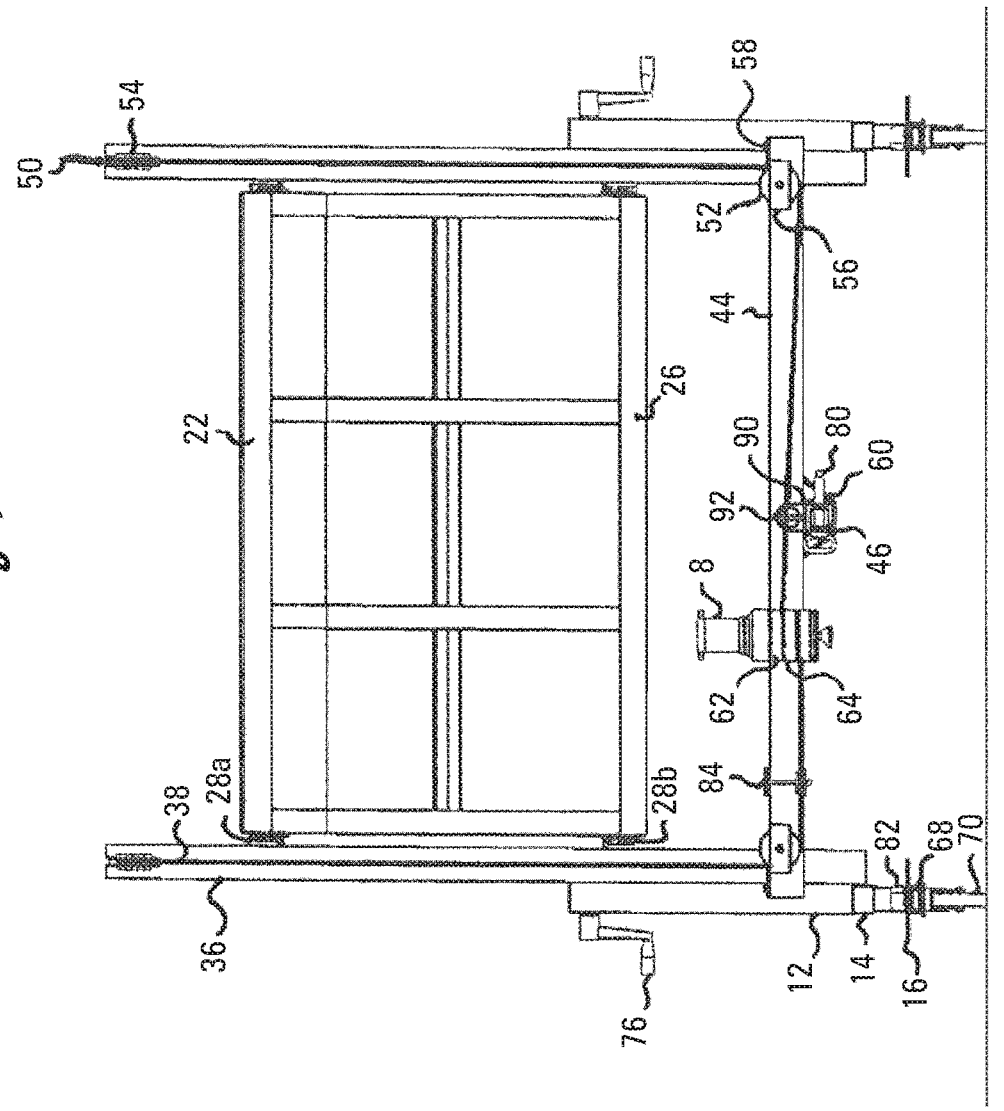
FIG. 9 is a rear partial cross-sectional view of the receiver-mounted lift gate in accordance with the embodiment of FIG. 1.

Referring next to FIG. 9, a rear partial cross-sectional view is shown of the receiver-mounted lift gate in accordance with the embodiment of FIG. 1.

A single tensioner 84 slidably mounts to the cross-member 44 between the lower sheave 52 and either side of the drive mechanism 8. The tensioner 84 reroutes the flexible tension member 38 away from a straight line path from the lower sheave 52 to the drive mechanism 8 so that the portion of the flexible tension member 38 between the lower sheave 52 and the tensioner 84 is parallel to the long axis of the cross-member 44 and the portion of the flexible tension member 38 between the tensioner 84 and drive mechanism 8 aligns at a variable angle with the cross-member's 44 long central axis in a plane generally parallel to the ground.

A skate body 68 is secured to the underside of each leg post 16 through skate fasteners 82 so that the leg post 16 is generally located at the center of the skate body 68 along its length. The long axis of the skate body 68 is aligned such that it is parallel to the ground and the long axis of the hitch 46. One caster wheel 70 mounts beneath each end of the skate body 68 so that the caster wheel's 70 mounting plate contacts the lower face of the skate body 68 and the roller contacts the ground.

As shown in FIG. 9 and as explained above, the flexible tension members 38 begin at the drive mechanism 8 and extend outwards to opposite lower sheaves 52. Each flexible tension member 38 wraps approximately 90 degrees around the lower sheave of its side and reaches upward, along the upright's 36 front face, and approximately 180 degrees around the upper sheave 50 and pivotally connects to the carrier 4. The drive mechanism 8 may also attach to one upright 36 so that the flexible tension members 38 start from the drive mechanism 8, but one goes directly to the upper sheave 50 of that corresponding upright 36 while the other flexible tension member 38 progresses through both lower sheaves 52 and the opposite upper sheave 50.

The drive mechanism 8 mounts to either the cross-member 44 or one of the uprights 36 and can be automatically powered through hydraulics and/or electricity or manually powered. The drive mechanism 8 can draw the flexible tension member 38 in or out through a rotational or linear actuator such as, but not limited to, an electric winch, lead screw, or hydraulic cylinder.

The drive mechanism 8 is preferably powered by, but not limited to, an electrical battery that is mounted on or near the invention, or the battery onboard the vehicle. Power may also be sourced from a wall outlet, generator or other source.

Figure 10:
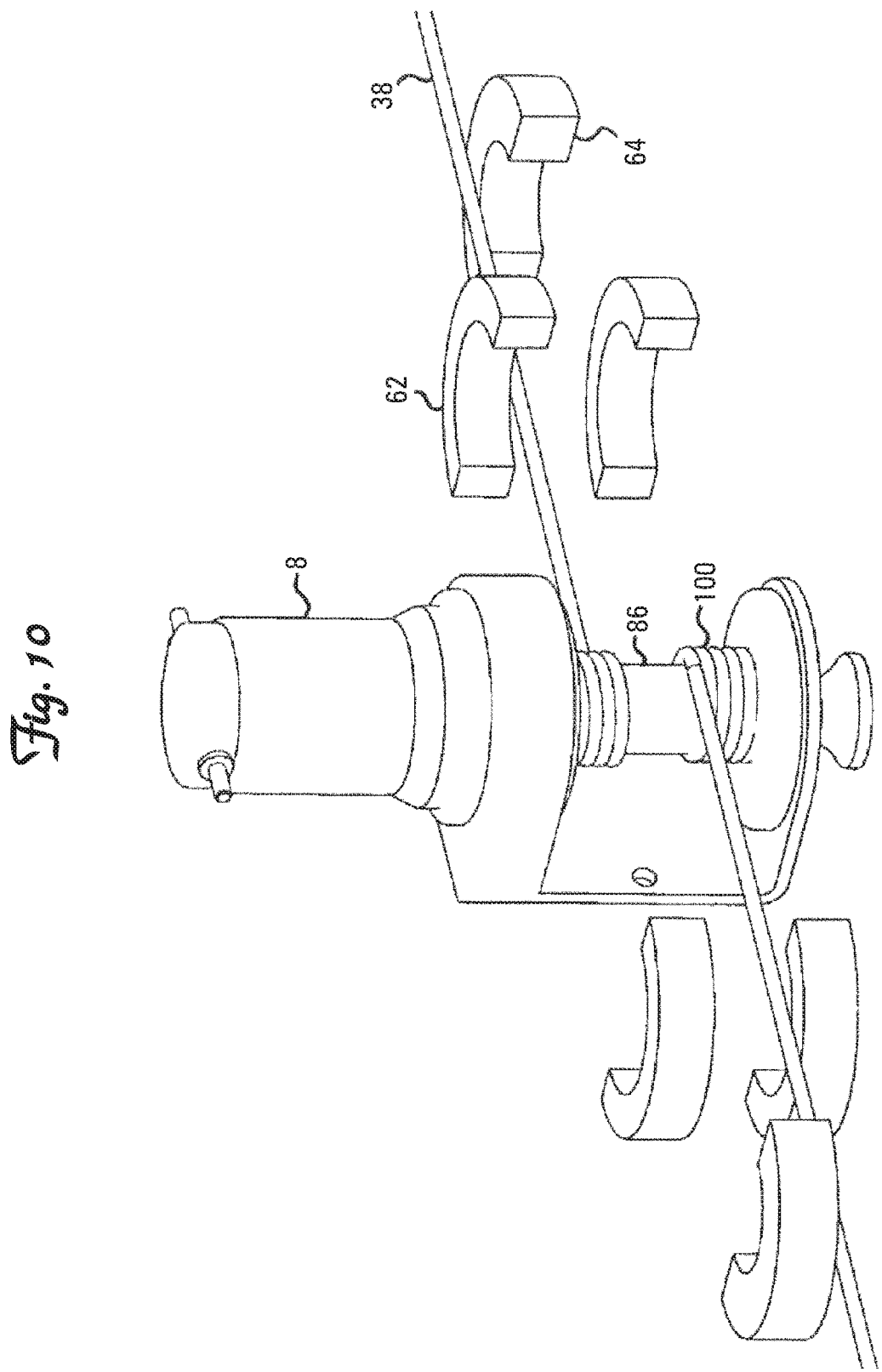
FIG. 10 is a partial, exploded assembly view of a winch mechanism of the receiver-mounted lift gate in accordance with the embodiment of FIG. 1.

Referring next to FIG. 10, a partial, exploded assembly view is shown of a winch mechanism (or motor) of the receiver-mounted lift gate in accordance with the embodiment of FIG. 1.

Shown are the drive mechanism 8, a spool 86, two flexible tension members 38, two base wraps 100, two spool clamps 62, and a spool spacer 64.

Figure 11:
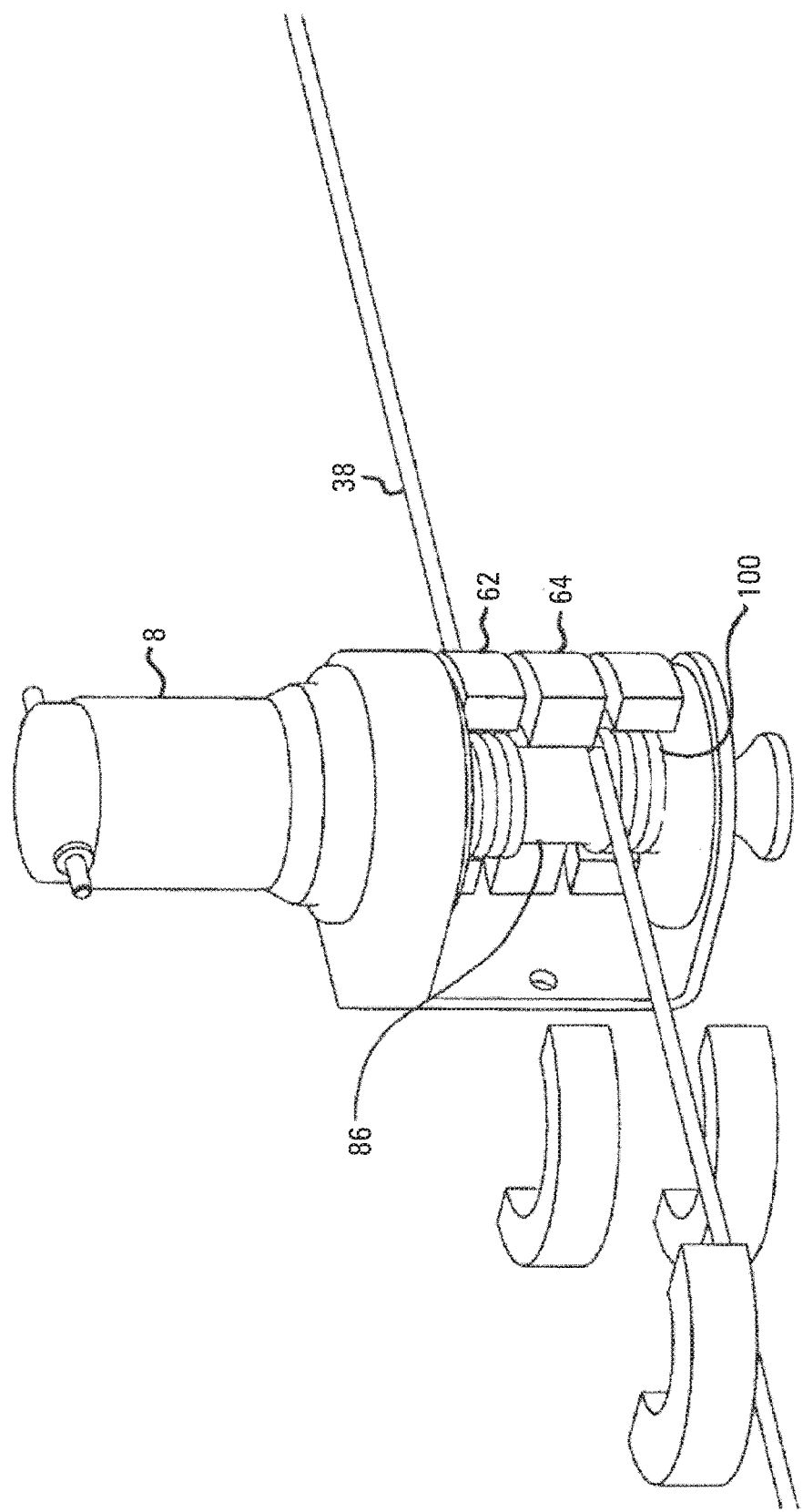
FIG. 11 is a further partial exploded assembly view of the winch mechanism of FIG. 10.
Figure 12:
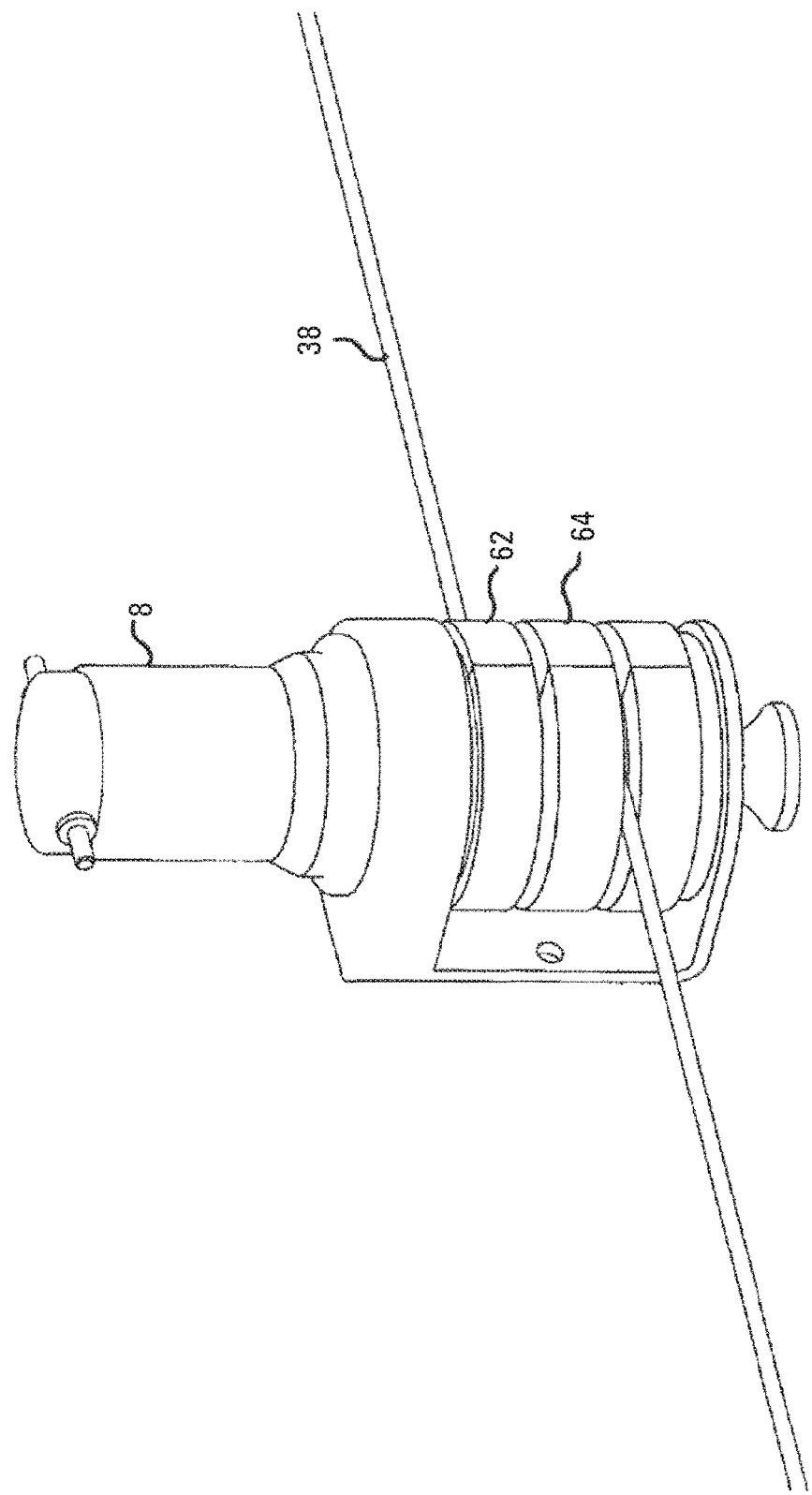
FIG. 12 is another partial exploded assembly view of the winch mechanism of FIG. 10.

In the case that a rotational drive mechanism 8 is used to control the feed of the flexible tension member 38, FIG. 10 demonstrates a spool 86 with base wraps 100 wound around in the manner explained above. Each set of base wraps 100 is covered by a spool clamp 62 that holds the base wraps in place and separated by a spool spacer 64 as shown in FIG. 11 and FIG. 12. Each flexible tension member 38 exits the spool 86 from the space between the spool spacer 64 and spool clamp 62, one exits from the top planar surface of the spool spacer 64 and the other exits from the lower planar surface of the spool spacer 64. The flexible tension members 38 exit tangentially from the spool in opposite directions and from opposite sides of the spool 86 in both the radial and axial directions.

When the drive mechanism 8 undergoes rotational motion, each flexible tension member 38 wraps around the spool 86 in a single plane that lies parallel to the planar face of the spool spacer 64 and coincident with the generally horizontal central axis of the flexible tension member 38 traveling from the drive mechanism 8 to the lower sheave 52. As the drive mechanism 8 continues to rotate each flexible tension member 38 continually wraps around itself in this single, horizontal plane in such a manner that the width of the single-plane winding increases by two flexible tension member 38 widths per complete revolution of the drive mechanism 8.

The controlled feed of the flexible tension member 38 in this single plane shape allows each flexible tension member 38 to be drawn or expelled from the drive mechanism 8 at equal rates.

In substitution of rotational drive mechanism modification an integrally shaped spool may be formed to the modified drive mechanism assembly shown in FIG. 12. The spool has a central spacer that separates the two flexible tension members 38 and a small space, slightly larger than the width of the flexible tension member 38, between planar surfaces located on each side of the central spacer. This accomplishes the same control of the flexible tension member windings along a single plane as the modified spool but does not require base wraps 100 or multiple modification pieces 62 and 64.

Referring next to FIG. 11, a further partial exploded assembly view is shown of the winch mechanism of FIG. 10.

Shown are the drive mechanism 8, a spool 86, two flexible tension members 38, two base wraps 100, two spool clamps 62, and a spool spacer 64.

Referring next to FIG. 12, another partial exploded assembly view is shown of the winch mechanism of FIG. 10.

Shown are the drive mechanism 8, two flexible tension members 38, two spool clamps 62, and a spool spacer 64.

Figure 13:
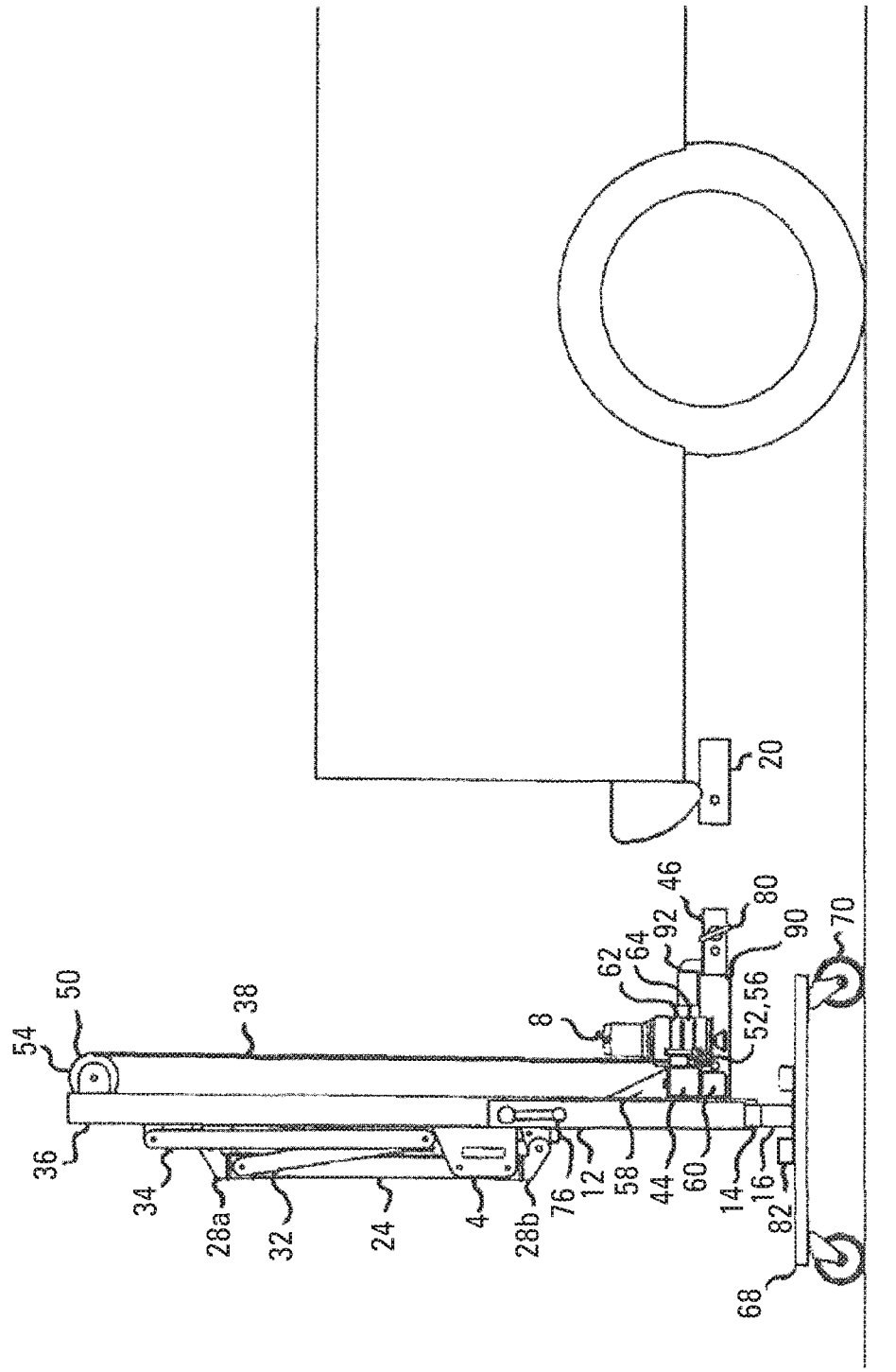
FIG. 13 is a side plan view of the receiver-mounted lift gate in accordance with the embodiment of FIG. 1 with a skate body and wheels supporting the receiver-mounted lift gate.

Referring next to FIG. 13, a side plan view is shown of the receiver-mounted lift gate in accordance with the embodiment of FIG. 1 with a skate body and wheels supporting the receiver-mounted lift gate.

FIG. 12 shows the form that the spool 86 could take. The spool 86 can be a component of the rotational drive mechanism 8 that embodies a generally cylindrical shape with two diametric groves which are approximately the width of the flexible tension member 38.

Shown are a platform center 24, a kick flap 26, a rear hinge 28a, a front hinge 28b, a carrier 4, a lower linkage 32, an upper linkage 34, an upright 36, a flexible tension member 38, an upper sheave support 54, an upper sheave 50, a leg outer shell 12, a leg inner shell 14, a leg post 16, a leg drive mechanism 76, a cross-member 44, a mounting bracket 58, a drive mechanism 8, two spool clamps 62, a spool spacer 64, a lower sheave 52, a lower sheave support 56, a hitch 46, a hitch gusset 60, a hitch sleeve 90, a hitch drive mechanism 92, a skate body 68, two caster wheels 70, two skate fasteners 82, and a hitch receiver 20 of a vehicle.

As shown in FIG. 13, the forward side faces of the platform center 24 pivotally connect to the respective carrier's 4 lower tab and the rearward side faces of the platform center 24 pivotally connect to the respective lower linkage 32. The opposing end of each lower linkage 32 pivotally connects to an upper linkage 34, which then pivotally attaches, at its opposite end, to the respective carrier's 4 upper tab. The kick flap 26 pivotally joins to the platform center 24 via the front hinges 28b located at the joint of the kick flap 26 and platform center 24.

The platform center 24 pivots about the carrier's 4 lower tab from a position parallel to the ground, shown in FIG. 2 to a position vertical to the ground, shown in FIG. 5. When the platform center 24 sits parallel to the ground, the lower linkages 32 and upper linkages 34 lockout in tension in an extended configuration with their long axes collinear as shown in FIG. 2. Prior to folding the platform center 24 to the vertical position by pivoting about the carrier's 4 lower tab, the kick flap 26 pivots about the front hinges 28b in such a manner that the top surface of the kick flap 26 is resting on the top surface of the platform center 24. The platform flap 22 then pivots about the rear hinges 28a in such a manner that the top surface of the platform flap 22 is resting on the bottom surface of the kick flap 26.

When the device is being attached to a vehicle 18 using the hitch receiver 20 interface, the device is able to move across the ground surface by the rolling action provided by the caster wheels 70. The actuation of the leg drive mechanism 76 results in the vertical translation of the position of the hitch 46. The leg drive mechanisms 76 are actuated until the vertical position of the hitch 46 is aligned and concentric with the hitch receiver 20. The device is then rolled forwards until the hitch 46 sits concentric and within the hitch receiver 20.

The caster wheels 70 are preferably made of a hard, durable material, such as nylon or steel, but may also be pneumatic or some other durable material.

The skate body 68, caster wheels 70, and skate fasteners 82 will hereout be collectively known as the skate assembly. The skate assembly detachably mounts to the leg post 16 and provides rolling contact between the ground and the invention. With the skate assembly attached, the invention can be translated across the ground in any direction parallel to the ground plane.

The skate assembly is detachably connected to the leg post 16, which can be vertically translated within the inner leg sleeve 14, and the inner leg sleeve 14 can be vertically translated within the outer leg sleeve 12 by the leg drive mechanism 76. The availability of height adjustment enables the hitch 46 to be raised and lowered relative to the ground until its long axis is aligned with the hitch receiver's 20 long axis and the hitch 46 can be inserted into the hitch receiver 20. The invention may also exist without the skate assembly.

Figure 14:
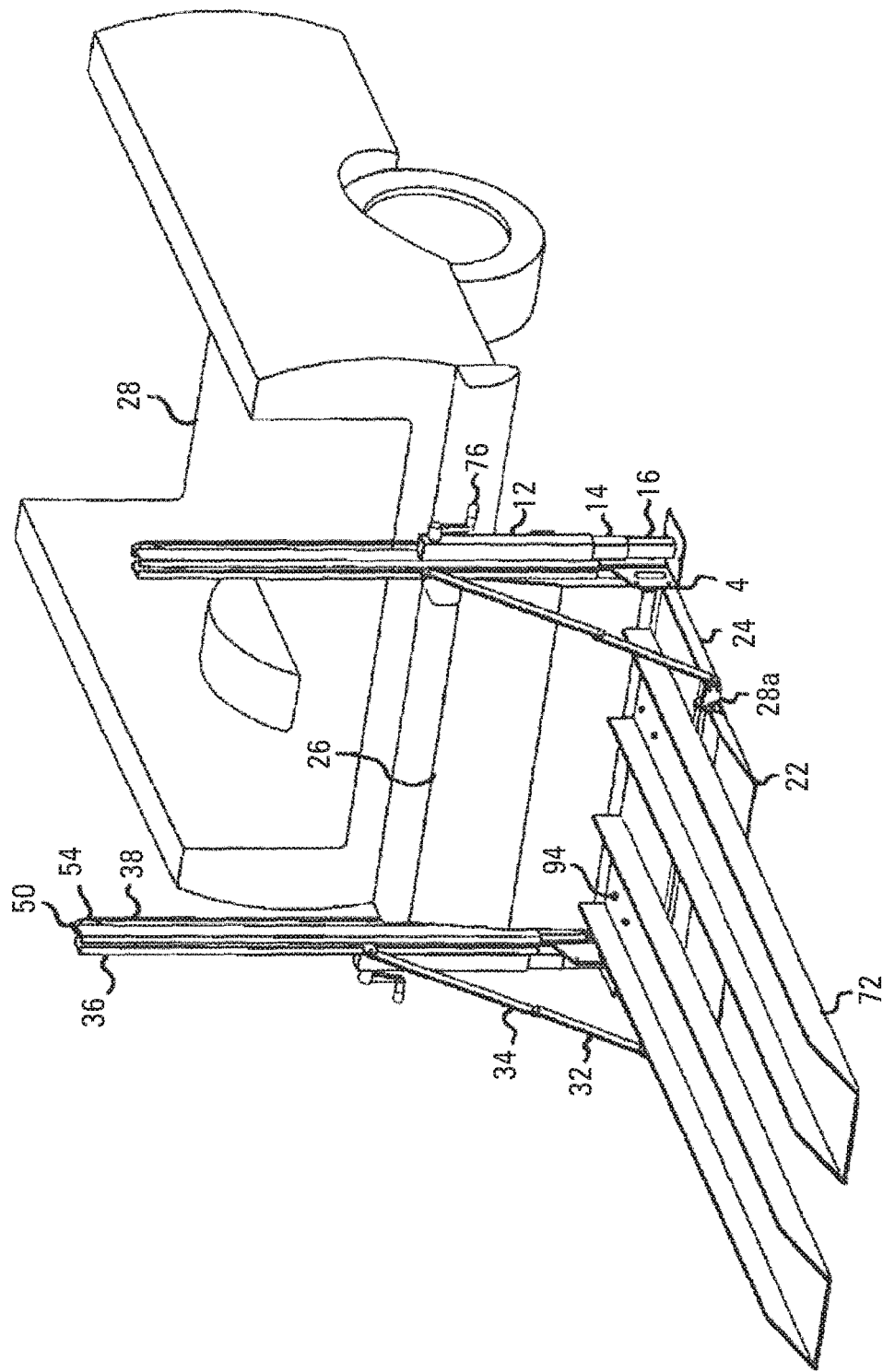
FIG. 14 is a side plan view of the receiver-mounted lift gate in accordance with the embodiment of FIG. 1 including accessories used with the receiver-mounted lift gate.

Referring next to FIG. 14, a side plan view is shown of the receiver-mounted lift gate in accordance with the embodiment of FIG. 1 including accessories used with the receiver-mounted lift gate.

A platform flap 22, a platform center 24, a kick flap 26, two rear hinges 28a, two front hinges 28b, two carriers 4, two lower linkages 32, two upper linkages 34, two uprights 36, two flexible tension members 38, two upper sheave supports 54, two upper sheaves 50, two leg outer shells 12, two leg inner shells 14, two leg posts 16, a leg drive mechanism 76, an accessory 72, accessory fasteners 94, and the cargo bed 18 of a vehicle are shown.

Accessories 72 attach to the platform center 24 and/or platform flap 22 enabling the invention to lift specific objects. In the embodiment shown in FIG. 14, the accessories 72 are configured to serve as extension beams and are coupled to the platform center 24 by the accessory fasteners 94. The accessories 72 may include, but are not limited to, extension beams, extension plates, handles and strap mounts that allow lifting objects including, but not limited to, a motorcycle, ATV, UTV, RTV, garbage cans, and lawn equipment. An accessory 72 may have the ability to serve as a cargo bed extender.

Figure 15:
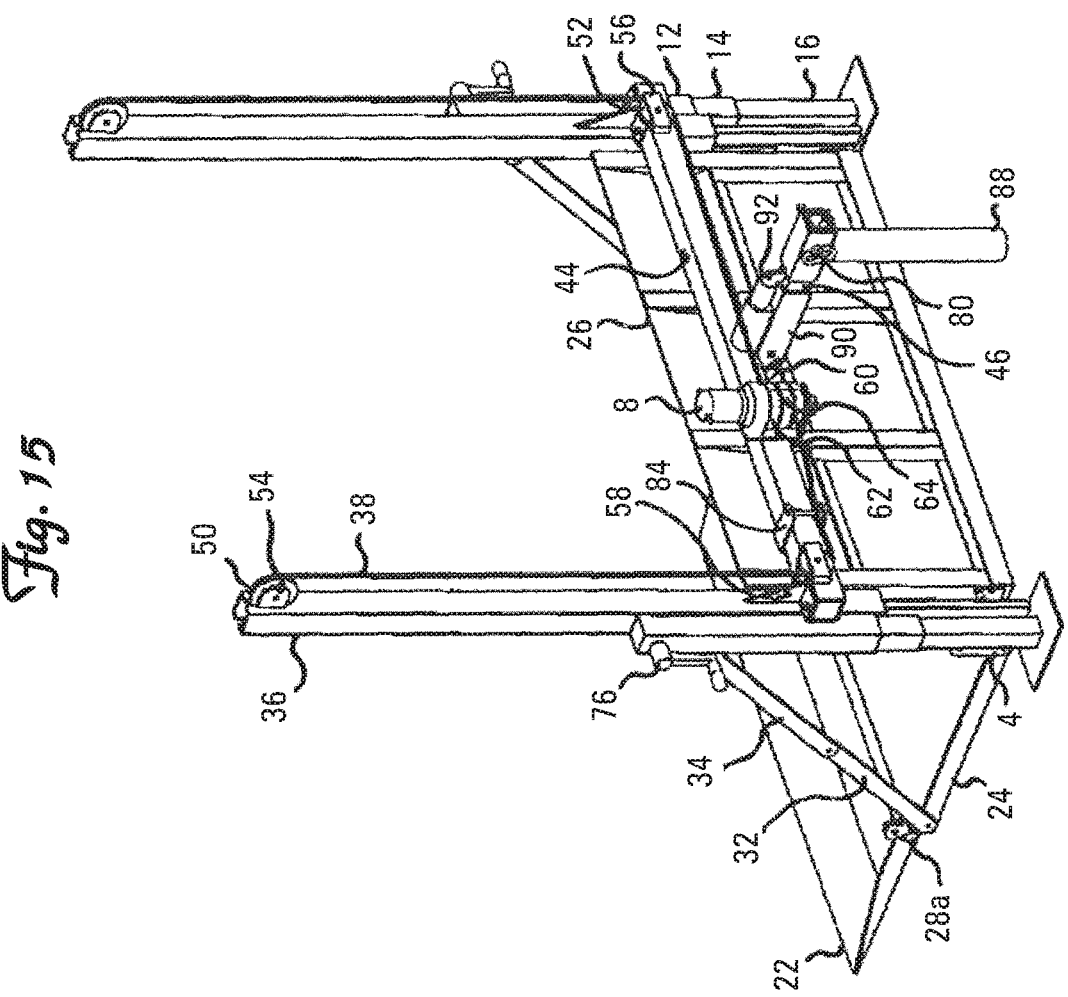

Referring next to FIG. 15, a side plan view is shown of the receiver-mounted lift gate in accordance with the embodiment of FIG. 1 including a ground-mounted receiver used with the receiver-mounted lift gate.

An additional embodiment of the removable lift gate system is shown in FIG. 15 and includes a platform flap 22, a platform center 24, a rear hinge 28a, a carrier 4, two lower linkages 32, tow upper linkages 34, two uprights 36, two flexible tension members 38, two upper sheave supports 54, two upper sheaves 50, two leg outer shells 12, two leg inner shells 14, two leg posts 16, two leg drive mechanisms 76, a cross-member 44, two mounting brackets 58, a drive mechanism 8, two spool clamps 62, a spool spacer 64, two lower sheaves 52, two lower sheave supports 56, a hitch 46, a hitch gusset 60, a hitch sleeve 90, a hitch drive mechanism 92, a tensioner 84 and a non-vehicular hitch receiver 88.

In lieu of coupling the removable lift gate system to the hitch receiver 20 of the vehicle, as previously shown in FIGS. 1-14, a ground mounted hitch receiver 88 may be provided. In the embodiment shown, a ground mounted hitch receiver 88 comprises a ground-supported vertical portion and a top portion configured to couple to the rear of the hitch 46, for example by use of the hitch pin 80 as previously described.

The embodiment shown in FIG. 15 including a ground mounted hitch receiver 88 enables the removable lift gate system to be used for non-vehicular applications, including, but not limited to, raising items to a height of a loading dock, or raising the platform center 24 and kick flap 26 to the height of a cargo vehicle which is located adjacent to but independent of the device described herein.

Figure 16:
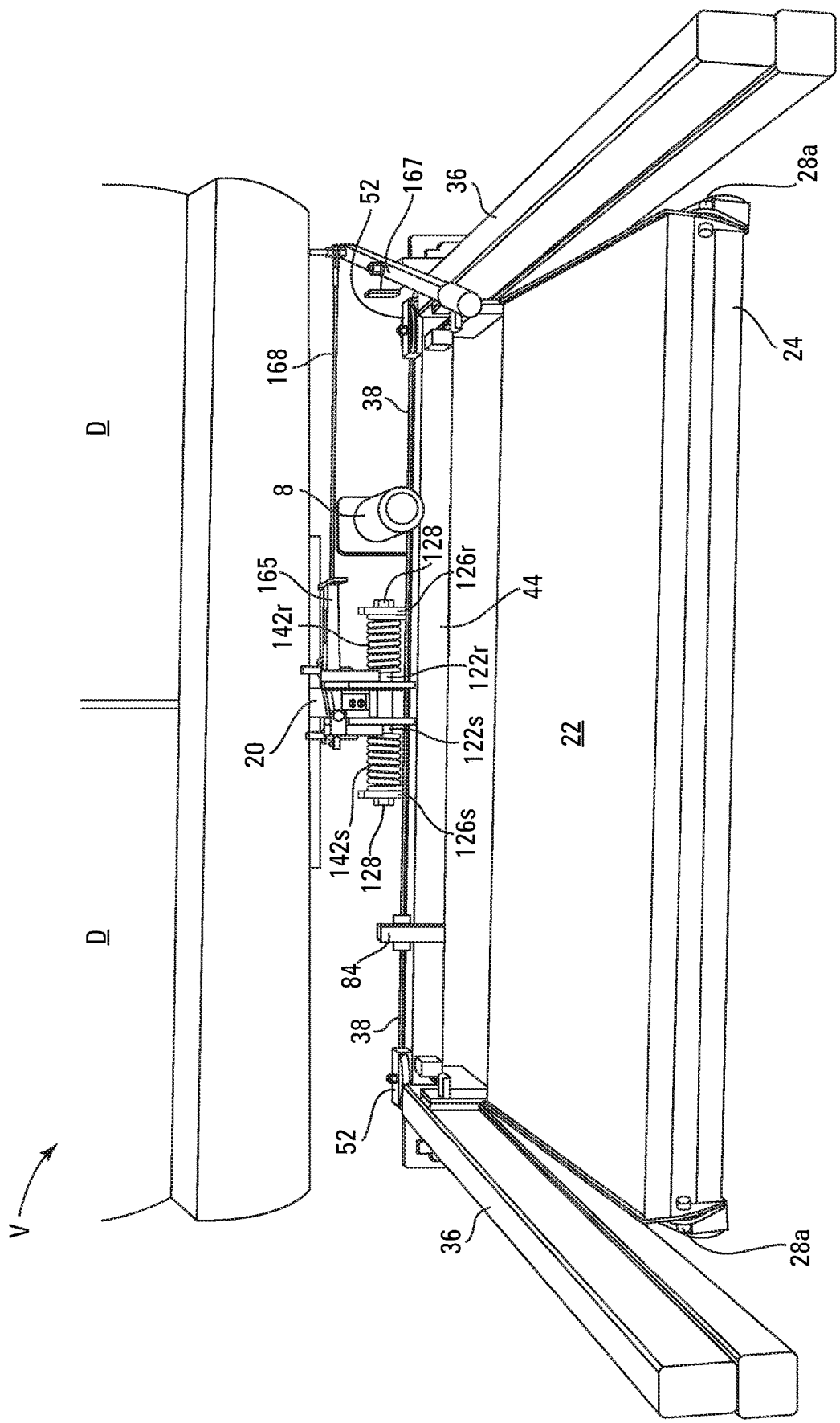
FIG. 16 is a front perspective view of the receiver-mounted lift gate in accordance with the embodiment of FIG. 1 equipped with a door access drop feature and depicted in the horizontal unlocked dropped position.
Figure 17:
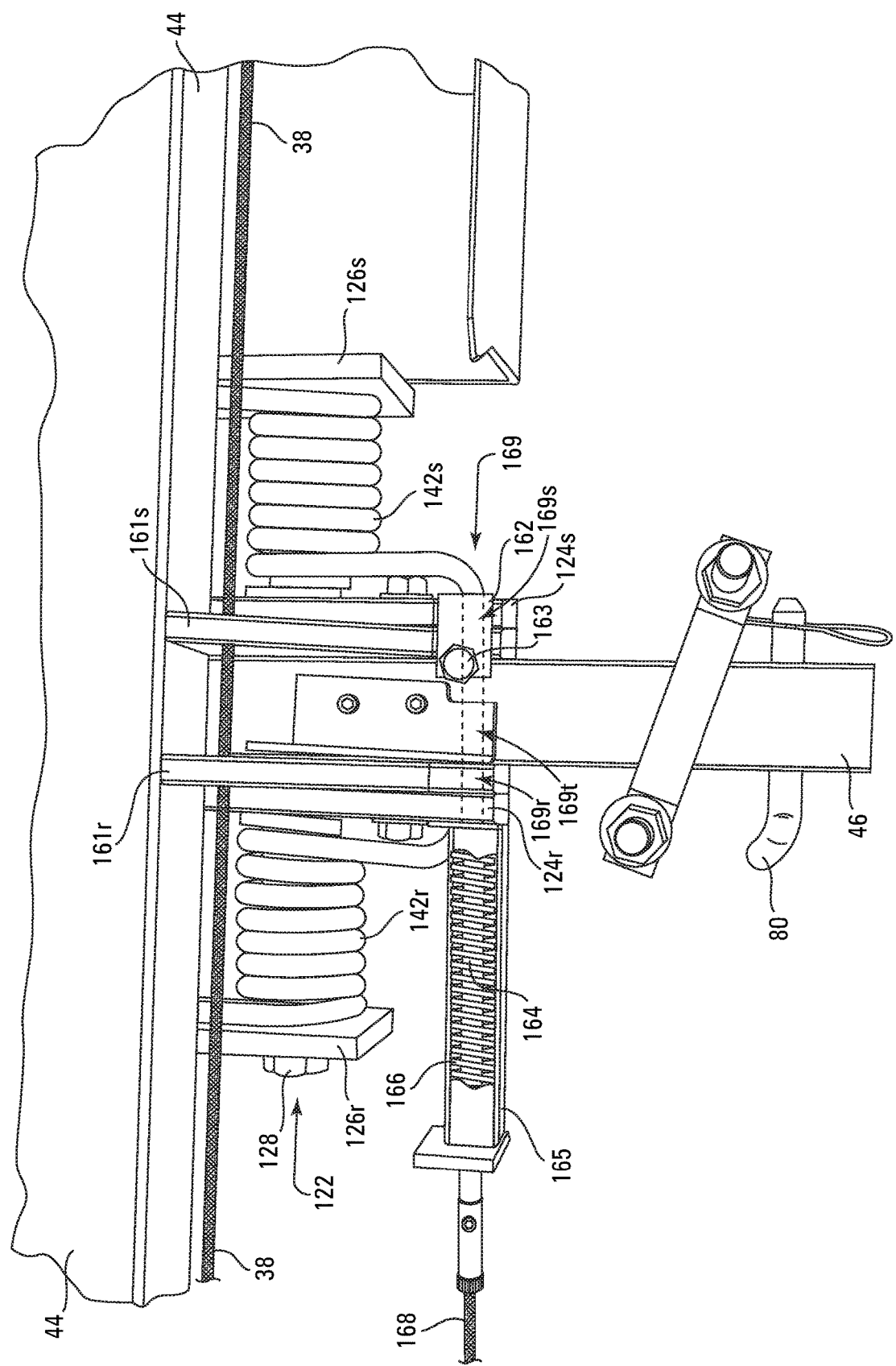
FIG. 17 is a top rear perspective view of the spring assist system and the locking system of the drop feature depicted in FIG. 16, with the lift gate system in the vertical locked use position.
Figure 18:
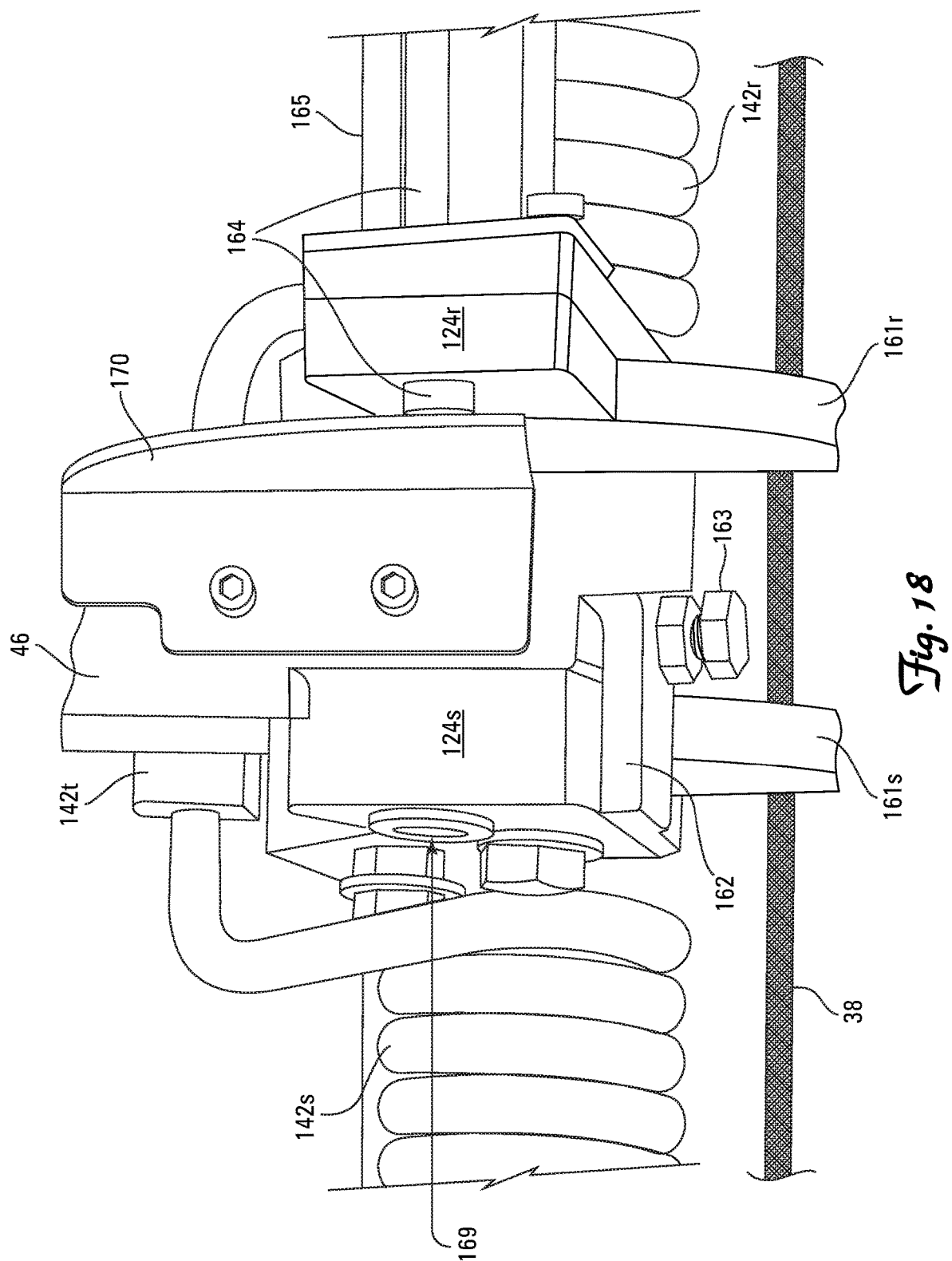
FIG. 18 is a top front perspective view of the spring assist system and the locking system of the drop feature depicted in FIG. 16, with the lift gate system the horizontal unlocked dropped position.

Referring to FIGS. 16, 17 and 18, the lift gate system may be equipped with a door access drop feature for allowing the entire upper portion of the lift gate system to be temporarily pivoted downward into a generally horizontal position while secured to the hitch receiver 20 of a vehicle (V). This accommodates opening and closing of standard side hinged outward pivoting rear door(s) (D) on a vehicle (V), such as found on a panel van, without need to detach and reattach the lift gate system to the vehicle (V).

The door access drop feature includes a pivot system 120, an optional but preferred spring lift assist system 140 and a position locking system 160.

The pivot system 120 includes a split shaft 122 having axially aligned right 122r and left 122s halves secured to an inside mounting plate 124 and an outside mounting plate 126 at each end of each shaft half 122r and 122s. The inside mounting plates 124r and 124s are attached to and project downward from either side of the hitch 20. The shaft halves 122 are each fixed attached to the inside mounting plates 124. The outside mounting plates 126r and 126s are attached to and, when the lift gate is pivoted into the vertical locked use position, project rearward from underneath the cross member 44. The shaft halves 122 each project through a bearing (not shown) in the respective outside mounting plate 126 and are secured into axial position by a bolt 128. This allows rotation of the outside mounting plates 126 about the shaft 122 as the lift gate is pivoted between a vertical locked use position, as depicted in FIG. 17, and a horizontal unlocked dropped position, as depicted in FIG. 18.

As best seen in FIGS. 17 and 18, the optional but preferred spring lift assist system 140 comprises a torsion spring 142 (i.e. a single piece forked torsion spring with right and left helical portions (not depicted) or a pair of torsion springs 142r and 142s as depicted in FIGS. 17 and 18).

The outside end of each torsion spring 142r and 142s is captured underneath the cross member 44 so as to helically wind and unwind with pivoting of the lift gate system about the shaft 122. The inside end of each torsion spring 142r and 142s is captured underneath the hitch, such as by a center block 142t attached to the underside of the hitch 20, so as to prevent helical winding and unwinding of the torsion springs 142r and 142s when the lift gate system is pivoted about the shaft 122.

Referring to FIGS. 16, 17 and 18, the locking system includes a pair of prongs 161, a stop tab 162, a biased locking pin 164, and an actuation lever 167.

A right side and a left side prong 161r, 161s extend from the cross member 44 on either side of the hitch 20. Axially aligned bores 169r and 169s extend through the prongs 161r and 161s respectively. The prongs 161 pivot with the cross-member 44 relative to the hitch 20 as between a locking position with the bores 169r and 169s axially aligned with a bore 169t through the hitch 20 and/or the inside mounting plates 124 as depicted in FIG. 17, and an unlocked position with the bores 169r and 169s axially misaligned with the bore 169t as depicted in FIG. 18. A stop tab 162 may extend horizontally from one of the prongs 161 for contacting the top of the hitch 20 and preventing continued lifting of the lift gate system about the shaft 122 when the prongs 161 are pivoted into the locking position and the bores 169r and 169s are axially aligned with bore 169t. A bolt 163 or similar device may be provided on the stop tab 162 for allowing adjustment of the stop position as necessary to ensure proper axial alignment of the bores 169.

A pin 164 is selectively insertable into the aligned bores 169 for locking the lift gate and preventing pivoting about the shaft 122 when inserted, and unlocking the lift gate so as to permit pivoting about the shaft 122 when withdrawn from the bores 169. The pin 164 is restrained in translatable axial alignment with the bores 169r and 169s by a sleeve 165 attached to one of the prongs 161. The pin 164 is preferably biased towards the locked positon by a spring 166 captured within the sleeve 165. A lever 167 is pivotally mounted on an upright 36 and operably connected to the pin 164 by a cable 168 or other suitable transfer mechanism for pulling the pin 164 against the bias from the inserted and locked position to a withdrawn and unlocked position for permitting pivoting of the lift gate system into the horizontal dropped access positon. A plate 170 may be provided on the hitch 20 for preventing a biased return of the pin 164 into the inserted position when the lift gate system has been dropped and the bores 169 are not aligned.

Use of Door Access Drop Feature

With the lift gate system mounted to the hitch receiver 20 of a vehicle V and the leg posts 16 lifted, as depicted in FIG. 5 but attached to a vehicle V with standard side-hinged doors D rather than a drop gate, the lift gate can be dropped for opening and closing of the doors D by (i) pulling the lever 167 so as to pull the pin 164 out from the bore 169 and into an unlocked position, (ii) manually pivoting the lift gate system about the shaft 122 from a vertical position to a horizontal position with resistance provided by the torsion spring(s) 142, (iii) opening the doors D, (iv) manually lifting the lift gate system about the shaft 122 back into the vertical position with assistance provided by the torsion spring(s) 142, until the bores 169r, 169s and 169t are axially aligned and the pin 164 is biased by spring 166 back into the inserted and locked position. The lift gate may now be used to load and unload a payload into the cargo bed 18 of the vehicle V through the open doors D. Upon completing the loading and/or unloading of payload from the cargo bed 18, steps (i)-(iv) are repeated with the doors D closed rather than opened. The vehicle V is once again ready for travel.

While the invention herein disclosed has been described by means of specific embodiments, examples and applications thereof, numerous modifications and variations could be made thereto by those skilled in the art without departing from the scope of the invention set forth in the claims.

What is claimed is:

1. A lift gate system comprising:
   (a) a first longitudinally extending upright including a first track;
   (b) a second longitudinally extending upright including a second track, wherein the second upright is parallel to the first upright;
   (c) a laterally extending cross member coupled to the first upright and coupled to the second upright;
   (d) a hitch sleeve pivotally coupled to and extending in a first transverse direction from the cross member for permitting pivoting of the cross member between 45° and 100° about a lateral axis relative to the hitch sleeve, whereby the first and second uprights are pivotable with the cross member as between a vertical use position and a horizontal dropped position with the uprights extending in a second transverse direction opposite the first transverse direction away from the hitch sleeve, and wherein the hitch sleeve is configured for detachable coupling to a receiver tube;
   (e) a first carrier coupled to the first upright, wherein the first carrier is coupled to the first upright, wherein the first carrier is configured to move along the first track;
   (f) a second carrier coupled to the second upright, wherein the second carrier is coupled to the second upright, wherein the second carrier is configured to move along the second track;
   (g) a platform coupled to the first carrier and the second carrier;
   (h) a drive mechanism coupled to the first carrier and to the second carrier, wherein the first carrier and the second carrier move at a same velocity when the drive mechanism is activated, whereby the platform is raised and lowered uniformly when the drive mechanism is activated.

2. The lift gate system of claim 1, further comprising a torsion spring biasing the cross member towards the vertical use position.

3. The lift gate system of claim 1, further comprising a locking mechanism for selectively locking and unlocking the cross member in the vertical use position.

4. The lift gate system of claim 3 wherein the locking mechanism is a locking pin laterally translatable within a lateral bore through the cross member and the hitch sleeve as between an inserted locking position and a withdrawn unlocked position.

5. The lift gate system of claim 4 wherein the locking pin is biased towards the inserted locking position and lateral translation of the locking pin from the inserted locking position to the withdrawn unlocked position is actuated by a lever pivotally attached to an upright.

6. The lift gate system of claim 1 wherein the cross member is pivotable approximately 90° relative to the hitch sleeve.

7. The lift gate system of claim 1, wherein the platform is pivotally coupled to the first carrier and the second carrier, and wherein the lift gate system further comprises:
   (a) a first upper linkage pivotally coupled to the first carrier;
   (b) a second upper linkage pivotally coupled to the second carrier;
   (c) a first lower linkage pivotally coupled to the first upper linkage and a first outer edge of the platform; and
   (d) a second lower linkage pivotally coupled to the second upper linkage and a second outer edge of the platform;
   (e) wherein the platform is rotatable to a position aligned with the first upright and the second upright.

8. The lift gate system of claim 1 further comprising:
   (a) a first telescoping leg coupled to the first upright, wherein the first telescoping leg is positional in a first lowered position and in a first raised position; and
   (b) a second telescoping leg coupled to the second upright, wherein the second telescoping leg is positional in a second lowered position and in a second raised position.

9. The lift gate system of claim 3 further comprising:
   (a) a first telescoping leg coupled to the first upright, wherein the first telescoping leg is positional in a first lowered position and in a first raised position; and
   (b) a second telescoping leg coupled to the second upright, wherein the second telescoping leg is positional in a second lowered position and in a second raised position.

10. The lift gate system of claim 1 further comprising a platform flap pivotally coupled to the platform along an edge of the platform distal to the first upright and the second upright.

11. The lift gate system of claim 1 further comprising:
   (a) a first skate body detachably coupled to the first upright;

(b) a second skate body detachably coupled to the second upright; and
(c) a plurality of wheels coupled to the each skate body;
(d) wherein the first skate body and the second skate body support the lift gate system when the lift gate system is decoupled from the receiver tube.

12. The lift gate system of claim 1 further comprising:
(a) a first cable coupled to the first upright and to the drive mechanism; and
(b) a second cable coupled to the second upright and to the drive mechanism.

13. The lift gate system of claim 12 wherein the first cable is at least partially enveloped by the first upright and the second cable is at least partially enveloped by the second upright.

14. The lift gate system of claim 13 further comprising:
(a) a first pulley coupled to the first upright and interposed between the first upright and the first cable; and
(b) a second pulley coupled to the second upright and interposed between the second upright and the second cable.

15. The lift gate system, of claim 14 further comprising:
(a) a third pulley coupled to the cross member and coupled to the first cable; and
(b) a fourth pulley coupled to the cross member and coupled to the second cable.

16. The lift gate system of claim 1 wherein the drive mechanism comprises a spool coupled to a first cable and a second cable.

17. The lift gate system of claim 16 further comprising a spool spacer encircling the spool and interposed between the first cable and the second cable.

18. A method of loading a payload into a cargo hold of a vehicle having at least one rear door which pivots about a vertical axis, using a lift gate system in accordance with claim 8 attached to a receiver tube on the vehicle, comprising the sequential steps of:
(a) pivoting the cross member from the vertical use position to the horizontal dropped position;
(b) opening the at least one rear door on the vehicle;
(c) pivoting the cross member from the horizontal dropped position into the vertical use position;
(d) lowering the first and second legs of the lift gate into supporting contact with ground;
(e) before or after step (d), pivoting the platform to horizontal, lowering the platform, and placing a payload onto the lowered horizontal platform;
(f) raising the loaded platform to vertically align with a floor of the cargo hold;
(g) moving the payload from the raised platform to the cargo hold;
(h) pivoting the platform to vertical;
(i) pivoting the cross member from the vertical use position to the horizontal dropped position;
(j) closing the at least one rear door on the vehicle; and
(k) pivoting the cross member from the horizontal dropped position into the vertical use position.

19. A method of loading a payload into a cargo hold of a vehicle having at least one rear door which pivots about a vertical axis, using a lift gate system in accordance with claim 9 attached to a receiver tube on the vehicle, comprising the sequential steps of:
(a) actuating the locking mechanism into the unlocked state;
(b) pivoting the cross member from the vertical use position to the horizontal dropped position;
(c) opening the at least one rear door on the vehicle;
(d) pivoting the cross member from the horizontal dropped position into the vertical use position;
(e) actuating the locking mechanism into the locked state;
(f) lowering the first and second legs of the lift gate into supporting contact with ground;
(g) before or after step (f), pivoting the platform to horizontal, lowering the platform, and placing a payload onto the lowered horizontal platform;
(h) raising the loaded platform to vertically align with a floor of the cargo hold;
(i) moving the payload from the raised platform to the cargo hold;
(j) pivoting the platform to vertical;
(k) actuating the locking mechanism into the unlocked state;
(l) pivoting the cross member from the vertical use position to the horizontal dropped position;
(m) closing the at least one rear door on the vehicle;
(n) pivoting the cross member from the horizontal dropped position into the vertical use position; and
(o) actuating the locking mechanism into the locked state.

* * * * *